(12) United States Patent
Nishizawa et al.

(10) Patent No.: US 7,359,594 B2
(45) Date of Patent: Apr. 15, 2008

(54) OPTICAL WAVEGUIDE STRUCTURE AND OPTICAL MODULE

(75) Inventors: Motoyuki Nishizawa, Kawasaki (JP); Koji Tsukamoto, Kasugai (JP); Masayuki Kato, Kawasaki (JP); Yasuo Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/937,881

(22) Filed: Sep. 10, 2004

(65) Prior Publication Data

US 2005/0058399 A1 Mar. 17, 2005

(30) Foreign Application Priority Data

Sep. 17, 2003 (JP) ............................. 2003-325208
Aug. 31, 2004 (JP) ............................. 2004-252750

(51) Int. Cl.
*G02B 6/26* (2006.01)

(52) U.S. Cl. ............................................ 385/32; 385/14

(58) Field of Classification Search .................. 385/32
See application file for complete search history.

(56) References Cited

U.S. PATENT DOCUMENTS

| 6,137,929 A | 10/2000 | Rosenberg et al. | |
|---|---|---|---|
| 6,931,167 B2* | 8/2005 | Ohtsu et al. | 385/14 |
| 2004/0057689 A1* | 3/2004 | Shimizu et al. | 385/129 |
| 2004/0120672 A1* | 6/2004 | Chong et al. | 385/129 |
| 2004/0184704 A1* | 9/2004 | Bakir et al. | 385/14 |

FOREIGN PATENT DOCUMENTS

| EP | 1020747 A1 | 7/2000 |
|---|---|---|
| JP | 62-35304 | 2/1987 |
| JP | 63149608 A * | 6/1988 |
| JP | 63-266405 | 11/1988 |
| JP | 5-88029 | 4/1993 |
| JP | 7-9492 | 1/1995 |
| JP | 8-327844 | 12/1996 |
| JP | 10-246827 | 9/1998 |
| JP | 2001-281482 | 10/2001 |

* cited by examiner

*Primary Examiner*—Michelle Connelly-Cushwa
(74) *Attorney, Agent, or Firm*—Kratz, Quintos & Hanson, LLP.

(57) ABSTRACT

An optical waveguide structure capable of optically coupling a surface type optical device, such as a surface emitting laser diode or a photodiode, and a transmission medium, such as an optical fiber, located so that their light output surface and light input surface will form an angle of about 90° with each other simply and easily. The optical waveguide structure comprises a first clad section having a curved surface for gradually turning the direction in which light travels almost squarely and a groove formed in the curved surface along the direction in which light travels, a core section which is made from a transparent material with a refractive index higher than the refractive index of the first clad section and with which the groove is filled in, and a second clad section which covers an exposed surface of the core section and the curved surface of the first clad section and which is integrated with the first clad section.

19 Claims, 49 Drawing Sheets

OPTICAL WAVEGUIDE STRUCTURE AND OPTICAL MODULE

CROSS-REFERENCE TO RELATED APPLICATIONS

This application is based upon and claims the benefits of priority from the prior Japanese Patent Applications No. 2003-325208, filed on Sep. 17, 2003, and No. 2004-252750, filed on Aug. 31, 2004, the entire contents of which are incorporated herein by reference.

BACKGROUND OF THE INVENTION (1) Field of the Invention

This invention relates to an optical waveguide structure suitable for coupling an optical device, such as a laser diode or a photodiode, included in an optical module used for optical communication or optical information processing and a transmission medium, such as an optical fiber or an optical waveguide and an optical module using such an optical waveguide structure.

(2) Description of the Related Art

For example, it is possible to make the integration level of surface emitting laser diodes which form an array higher than that of ordinary edge emitting laser diodes which form an array. That is to say, compared with ordinary edge emitting laser diodes, a large number of surface emitting laser diodes can be mounted on a board. Therefore, surface emitting laser diodes are considered to be key components used for optical communication in which large capacity transmission is needed or optical information processing in which a high integration level is needed.

To fabricate a module in which surface emitting laser diodes are mounted on a board and in which laser beams are inputted into transmission media, such as optical fibers, the optical fibers will be located perpendicularly to the board, especially if a special optical system, such as a mirror, for deflecting light is not used.

FIG. 48 is a sectional view of a feature of a module in which an optical fiber is located perpendicularly to a board. In FIG. 48, a board 1, a surface type optical device 2, an optical fiber 3, and a core 3A of the optical fiber 3 are shown. The surface type optical device 2 is a surface emitting laser diode, a photodiode, or the like.

If the optical fiber 3 is located perpendicularly to the board 1 as shown in FIG. 48, there are problems with mounting. For example, the work is troublesome. Moreover, this structure is not suitable for realizing a flat optical module. Therefore, it is preferable to locate the optical fiber 3 parallel to the board 1.

Optical modules have various structures. In some cases, it is necessary to input light outputted from a surface emitting laser diode into an optical waveguide. Such an optical module should have a structure in which a surface emitting laser diode and an optical waveguide are mounted on the same board from the manufacturing viewpoint.

This needs an optical system for deflecting light from a surface type optical device almost squarely to couple the surface type optical device mounted on a board and an optical fiber or an optical waveguide. A system in which reflection by an inclined mirror located at an appropriate position on an optical path is used is known as such an optical system (see, for example, Japanese unexamined Patent Publication No. 62-35304, Japanese unexamined Patent Publication No. 5-88029, and International Publication No. 00/08505.)

FIG. 49 is a sectional view of a feature of an optical system in which an inclined mirror is located at an appropriate position on an optical path. In FIG. 49, a lens 4 and an inclined mirror 5 are shown. The same symbols that are used in FIG. 48 indicate the same components or have the same meanings.

As shown in FIG. 49, an optical fiber 3 is located parallel to a board 1. Light outputted from a surface type optical device 2 mounted on the board 1 is inputted into the inclined mirror 5 via the lens 4, is squarely reflected there, and is inputted into the optical fiber 3.

SUMMARY OF THE INVENTION

An optical waveguide structure provided in the present invention comprises a first clad section having a curved surface for turning the direction in which light travels and a groove formed in the curved surface along the direction in which light travels; a core section which is made from a transparent material with a refractive index higher than the refractive index of the first clad section and with which at least the groove is filled in; and a second clad section which covers a surface including at least an exposed surface of the core section and which is integrated with the first clad section.

In addition, an optical module provided in the present invention comprises a board; an optical device mounted on the board; and an optical waveguide structure which propagates light inputted to the optical device or light outputted from the optical device, the optical waveguide structure including a first clad section having a groove on a convex surface side of a curved surface with an arc-like cross section which is formed along the curved surface, a core section with which the groove is filled in and by which light is propagated, and a second clad section which is formed on the convex surface side of the curved surface and which covers the core section, the optical waveguide structure being located so that an end of the core section will be directly above the optical device mounted on the board.

The above and other features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 49:
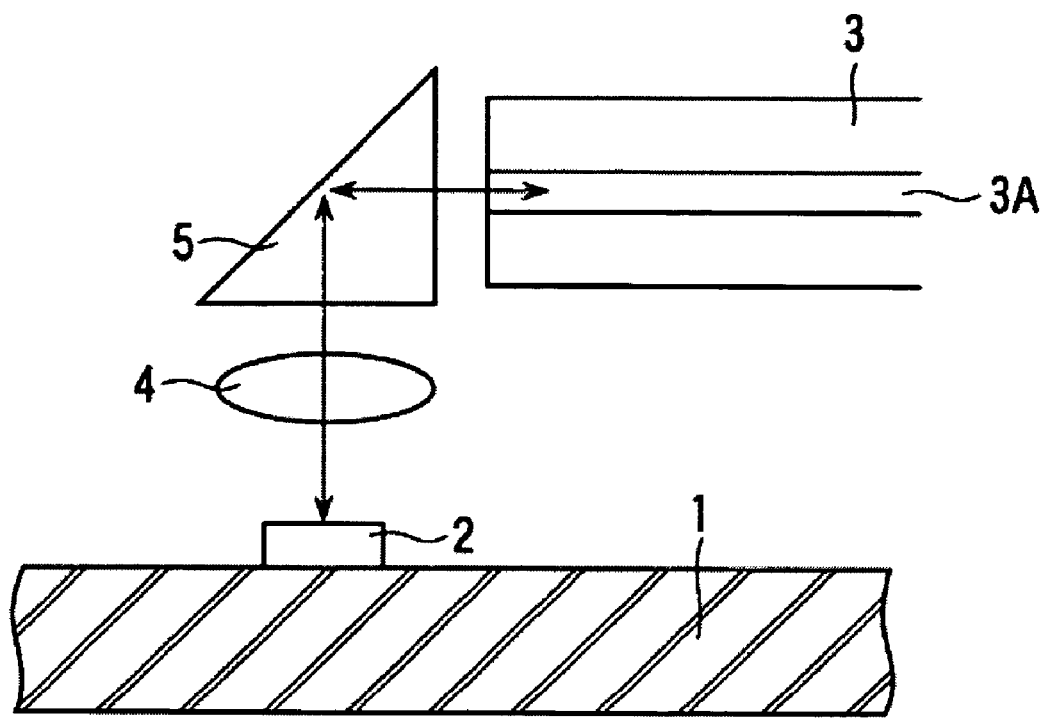
FIG. 49 is a sectional view of a feature of an optical system in which an inclined mirror is located at an appropriate position on an optical path.

An inclined mirror 5 used in this case must have a highly accurate shape from the viewpoints of flatness, surface roughness, and the like. Accordingly, it is not easy to fabricate a mirror having an adequate function as an optical module. Moreover, to realize the structure shown in FIG. 49, it is necessary that light outputted from the surface type optical device 2 should be focused by the lens 4, be reflected by the inclined mirror 5, and be inputted accurately into the optical fiber 3. Therefore, it is necessary to accurately align the optical axis of the lens 4, for example, with the position of a reflection point on the inclined mirror 5. That is to say, this optical system is not excellent from the viewpoint of practicability.

An optical system in which an optical fiber is bent almost squarely to couple the optical fiber and a surface type optical device is known as another conventional technique (see, for example, U.S. Pat. No. 6,137,929).

With the technique disclosed in U.S. Pat. No. 6,137,929, a lens is not used, so there is no need to adjust an optical axis. However, an optical fiber must be bent with great accuracy and the state in which it is bent must be maintained. It is difficult to assemble such a module.

At present, there is a demand for low-cost optical modules in the optical communication and optical information processing markets. Accordingly, optical modules which have a simple structure and which can easily be assembled must be provided.

For this reason, some proposals regarding the structure of, and a method for forming, optical waveguides are offered in addition to the above-mentioned proposals (see, for example, Japanese Examined Patent Publication No. 7-9492, Japanese Unexamined Patent Publication No. 8-327844, and Japanese Unexamined Patent Publication No. 10-246827).

An object of the present invention is to realize an optical waveguide structure capable of optically coupling a surface type optical device, such as a surface emitting laser diode or a photodiode, and a transmission medium, such as an optical fiber, located so that their light output surface and light input surface will form an angle of about 90° with each other simply and easily in place of a mirror.

Another object of the present invention is to realize an optical module using such an optical waveguide structure.

A first embodiment of the present invention will now be described first.

Figure 1:
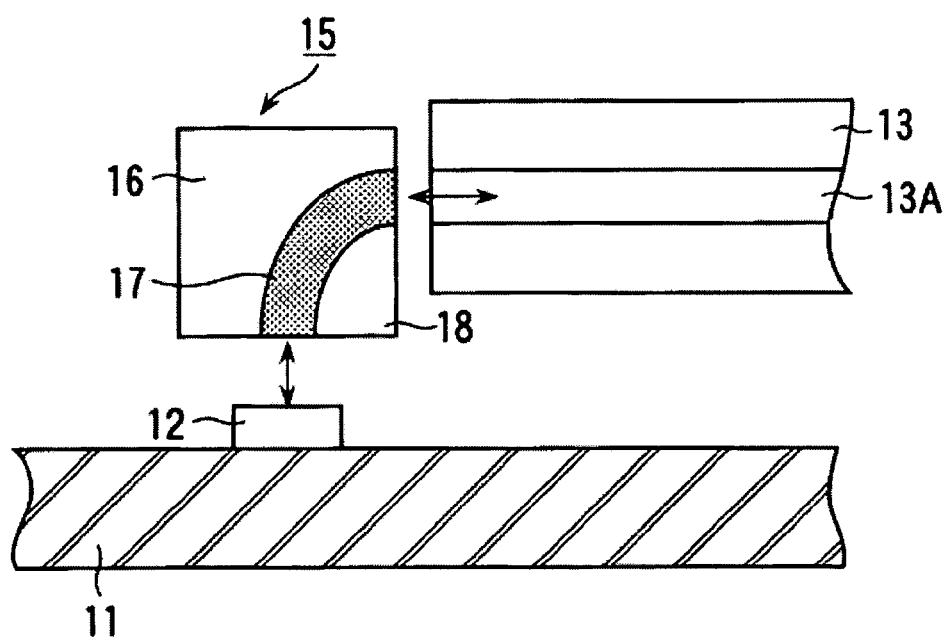
FIG. 1 is a sectional view of a feature of an optical module fabricated by the use of an optical waveguide according to a first embodiment of the present invention.

FIG. 1 is a sectional view of a feature of an optical module fabricated by the use of an optical waveguide according to a first embodiment of the present invention. In FIG. 1, a board 11, a surface type optical device 12, an optical fiber 13, and a core 13A of the optical fiber 13, an optical waveguide 15, a first clad section 16, a core section 17, and a second clad section 18 are shown.

Figure 2:
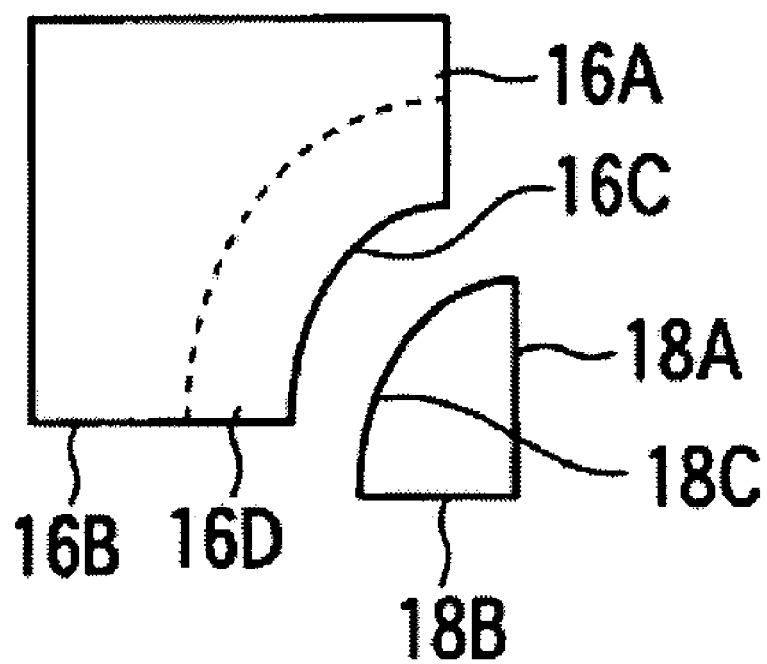
FIG. 2 is a side view of a feature for roughly describing a first process performed for fabricating the optical waveguide according to the first embodiment of the present invention.
Figure 3:
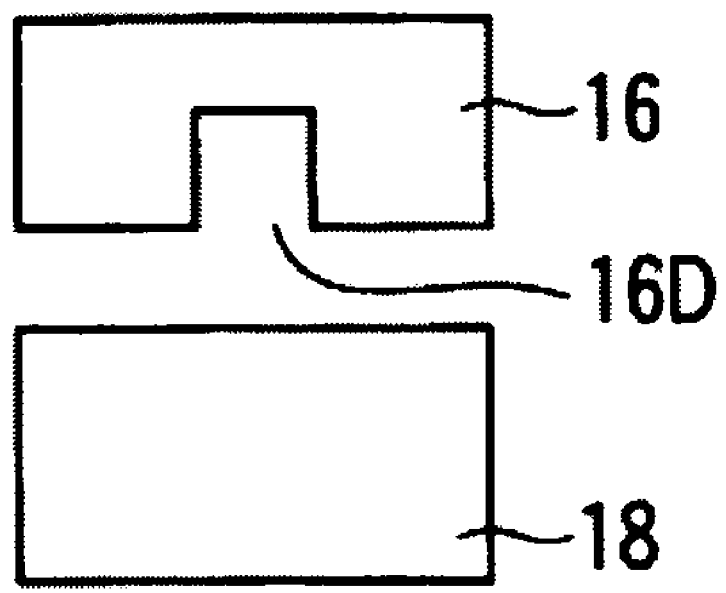
FIG. 3 is a front view of the feature for roughly describing the first process performed for fabricating the optical waveguide according to the first embodiment of the present invention.
Figure 4:
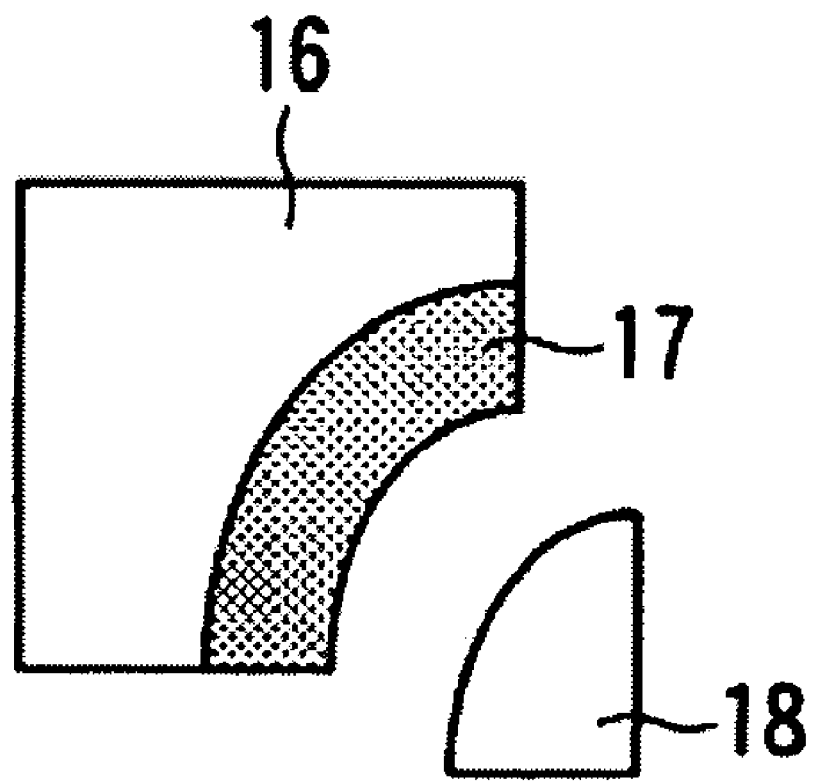
FIG. 4 is a side view of a feature for roughly describing a second process performed for fabricating the optical waveguide according to the first embodiment of the present invention.
Figure 5:
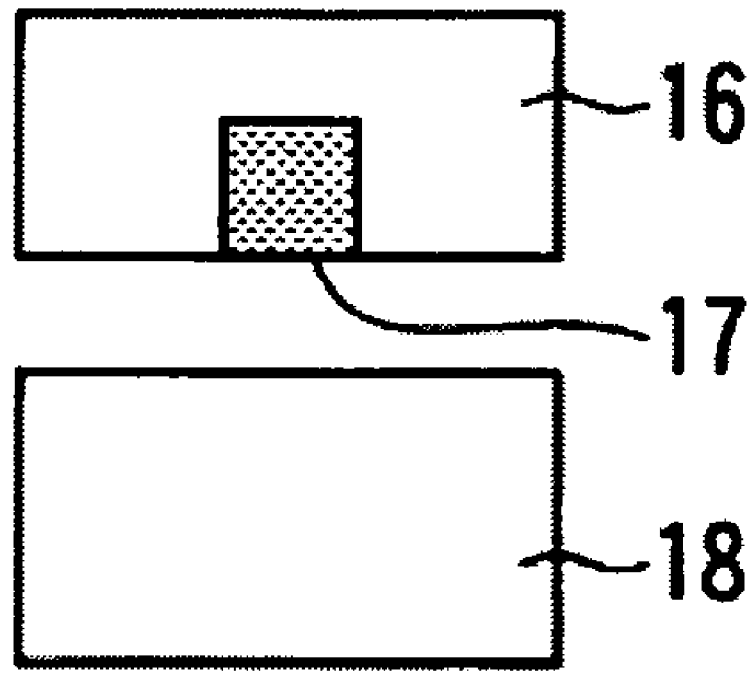
FIG. 5 is a front view of the feature for roughly describing the second process performed for fabricating the optical waveguide according to the first embodiment of the present invention.
Figure 6:
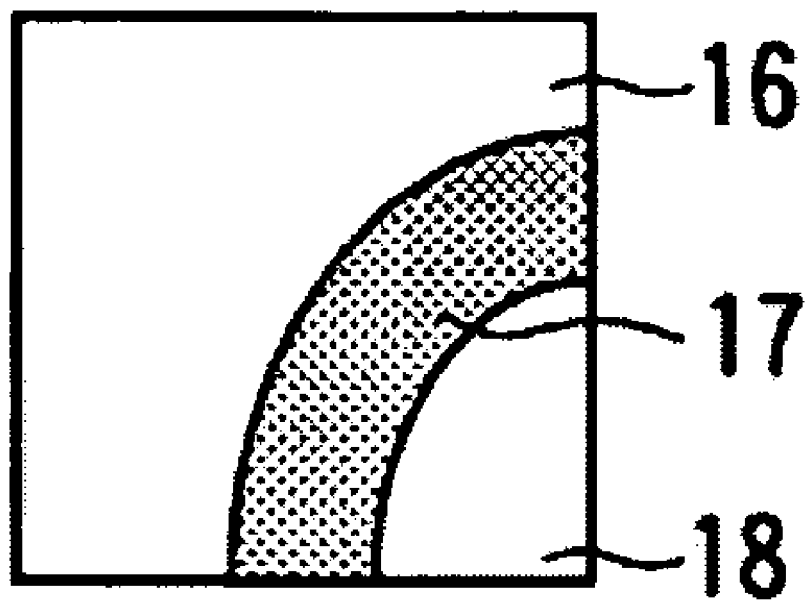
FIG. 6 is a side view of a feature for roughly describing a third process performed for fabricating the optical waveguide according to the first embodiment of the present invention.
Figure 7:
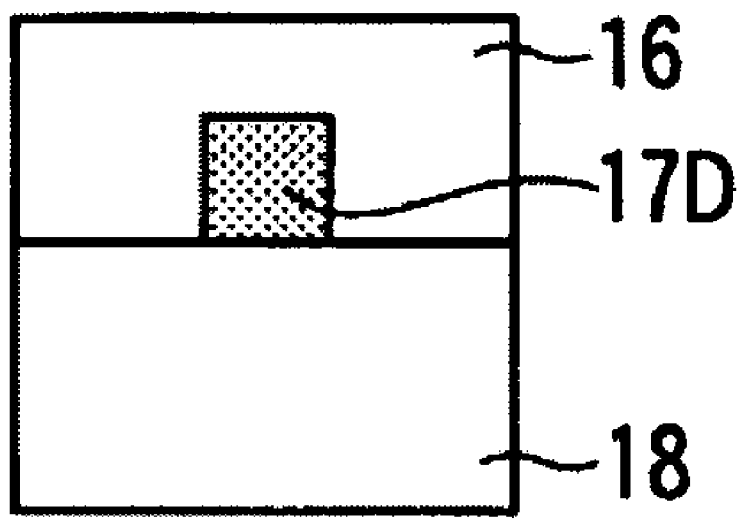
FIG. 7 is a front view of the feature for roughly describing the third process performed for fabricating the optical waveguide according to the first embodiment of the present invention.

FIGS. 2 through 7 are views for roughly describing processes for fabricating the optical waveguide according to the first embodiment of the present invention. FIG. 2 is a side view of a feature for roughly describing a first process performed for fabricating the optical waveguide according to the first embodiment of the present invention. FIG. 3 is a front view of the feature for roughly describing the first process performed for fabricating the optical waveguide according to the first embodiment of the present invention. FIG. 4 is a side view of a feature for roughly describing a second process performed for fabricating the optical waveguide according to the first embodiment of the present invention. FIG. 5 is a front view of the feature for roughly describing the second process performed for fabricating the optical waveguide according to the first embodiment of the present invention. FIG. 6 is a side view of a feature for roughly describing a third process performed for fabricating the optical waveguide according to the first embodiment of the present invention. FIG. 7 is a front view of the feature for roughly describing the third process performed for fabricating the optical waveguide according to the first embodiment of the present invention. The same symbols that are used in FIG. 1 indicate the same components or have the same meanings.

(First Process)

The first process is shown in FIGS. 2 and 3. A first clad section 16 and a second clad section 18 are made by injection molding by the use of a metal mold including a first block having a curved surface and a convex portion in an area on the curved surface where a core section is to be embedded for forming a groove and a second block having a structure corresponding to the first block and a transparent clad material.

The first clad section 16 made has an edge 16A opposite an optical transmission medium and another edge 16B which forms an angle of about 90° with the edge 16A. The edges 16A and 16B are connected by a gentle curved surface 16C. A groove 16D is formed approximately in the middle of the curved surface 16C where the core section is to be formed.

The second clad section 18 made has a shape that fills in the curved surface 16C of the first clad section 16. That is to say, the second clad section 18 has an edge 18A that connects with the edge 16A of the first clad section 16 to form a plane and another edge 18B that connects with the edge 16B of the first clad section 16 to form a plane. The edges 18A and 18B are connected by a curved surface 18C corresponding to the curved surface 16C of the first clad section 16.

A method for making the first clad section 16 and the second clad section 18 is not limited to injection molding. For example, press molding may be used. Moreover, mechanical cutting, laser abrasion, sandblast, a plasma process, and the like may be combined.

(Second Process)

The second process is shown in FIGS. 4 and 5. The groove 16D in the first clad section 16 is filled in with a transparent material the refractive index of which is greater than that of the clad material to form a core section 17.

(Third Process)

The third process is shown in FIGS. 6 and 7. The first clad section 16 and the second clad section 18 are joined together to complete an optical waveguide 15.

A transparent solid material, such as plastic, glass, or quartz, can be used for fabricating the optical waveguide according to the first embodiment of the present invention. The clad material and the core material are selected from among them with their refractive indexes taken into consideration. Plastic or low-melting-point glass is preferable from the viewpoint of molding.

As described in FIG. 1, the optical waveguide according to the first embodiment of the present invention is located to optically couple the surface type optical device and the optical fiber, being an optical transmission medium. As a result, an optical signal can be sent efficiently between the surface type optical device and the optical transmission medium. In this case, light outputted from the surface type optical device may be inputted directly to the optical waveguide located just above the surface type optical device or be inputted to the optical waveguide via a lens formed on the optical waveguide.

Figure 8:
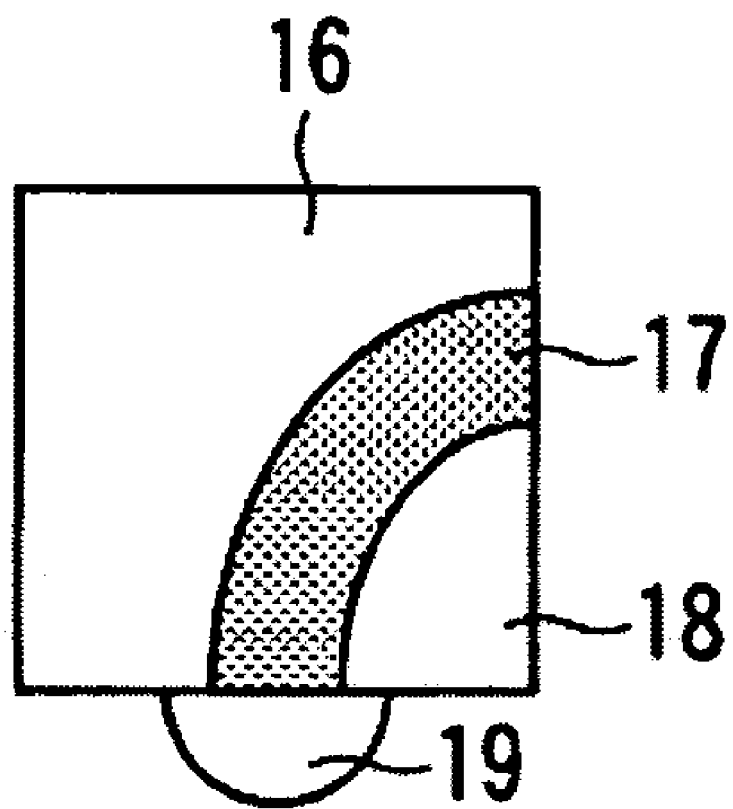
FIG. 8 is a side view for describing a feature of an optical waveguide on which a lens is formed.
Figure 9:
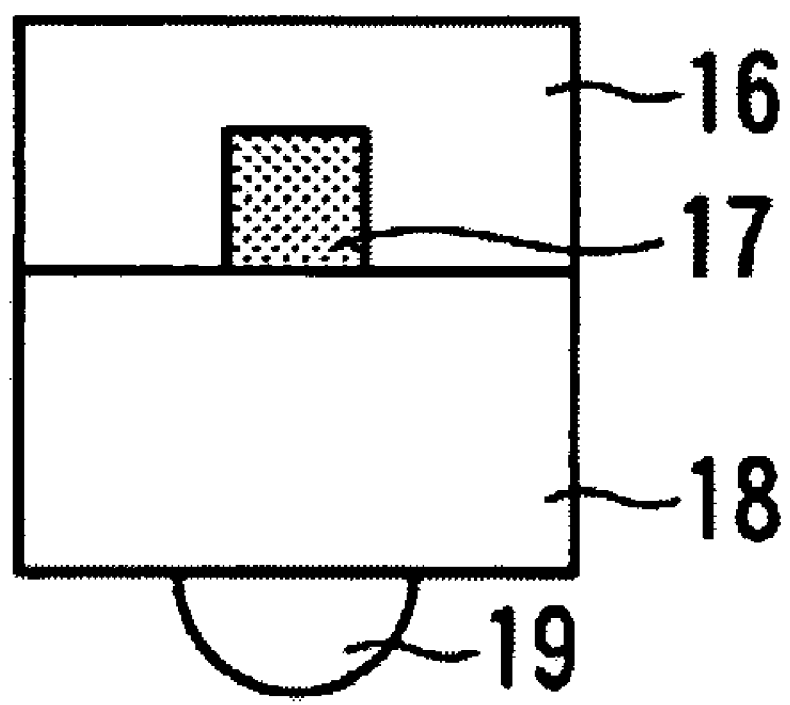
FIG. 9 is a front view for describing the feature of the optical waveguide on which the lens is formed.

FIGS. 8 and 9 are views for describing an optical waveguide on which a lens is formed. FIG. 8 is a side view of a feature of an optical waveguide on which a lens is formed. FIG. 9 is a front view of the feature of the optical waveguide on which the lens is formed. A lens 19 is shown in FIGS. 8 and 9. The same symbols that are used in FIGS. 2 through 7 indicate the same components or have the same meanings.

If the optical waveguide according to the first embodiment of the present invention includes the lens 19, the lens 19 is integrated into the optical waveguide. Accordingly, the optical waveguide according to the first embodiment of the present invention differs from conventional optical modules using a reflection mirror, a lens, and the like in that there is no need for troublesome optical axis alignment.

In each of the different optical waveguides described above, the width of the core section is constant. Therefore, the size of an aperture on the light input (or output) side is the same as that of an aperture on the light output (or input) side. In many cases, however, the size of a light-emitting area on a surface type optical device does not match the diameter of the core of an optical transmission medium or the size of an aperture. In such cases, a core section should have a taper structure, the cross-sectional area of which gradually changes in the direction in which light propagates, to reduce coupling loss.

Figure 10:
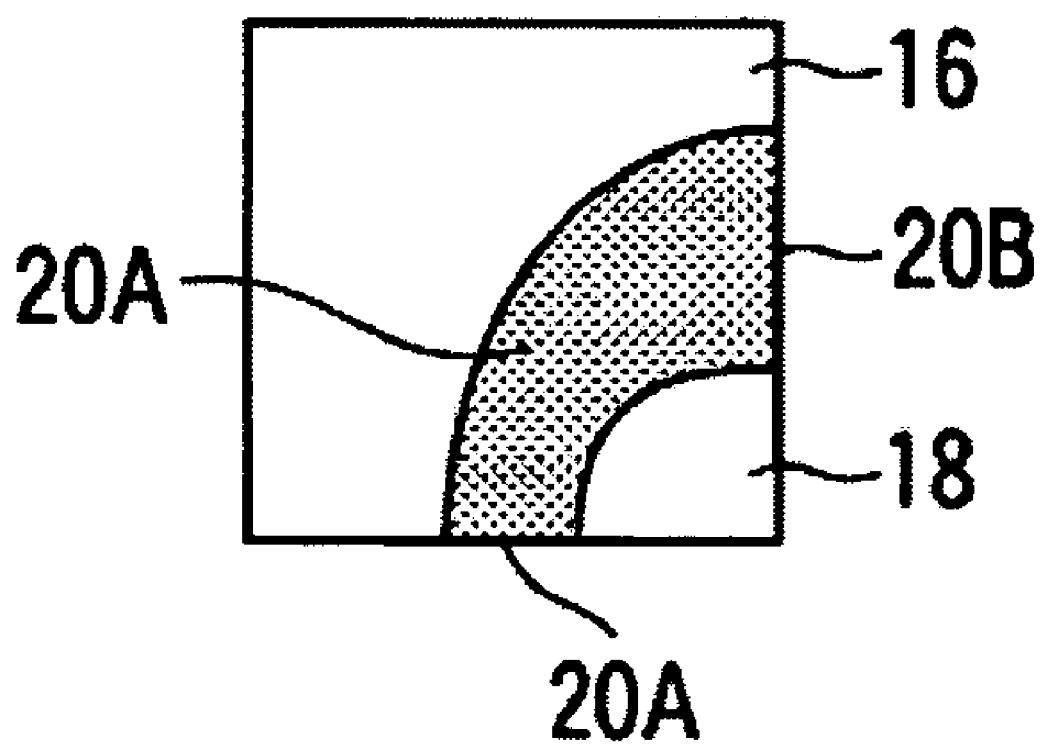
FIG. 10 is a side view for describing a feature of an optical waveguide in which a core section has a taper structure.
Figure 11:
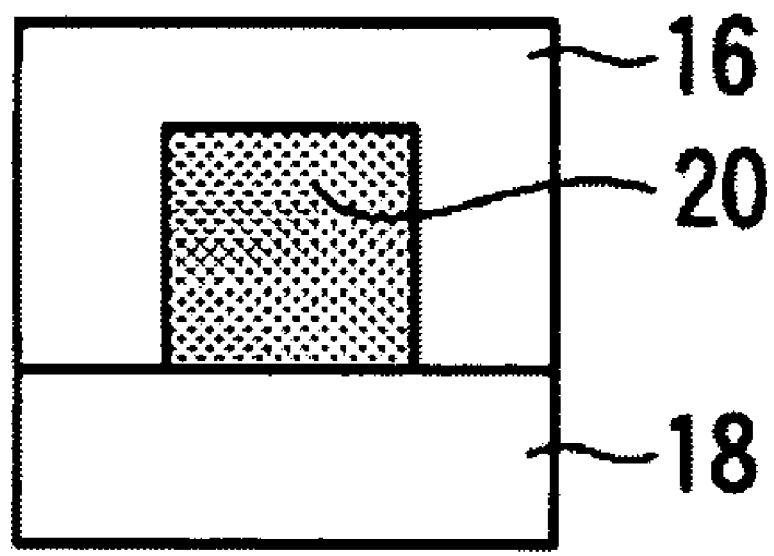
FIG. 11 is a front view for describing the feature of the optical waveguide in which the core section has the taper structure.
Figure 12:
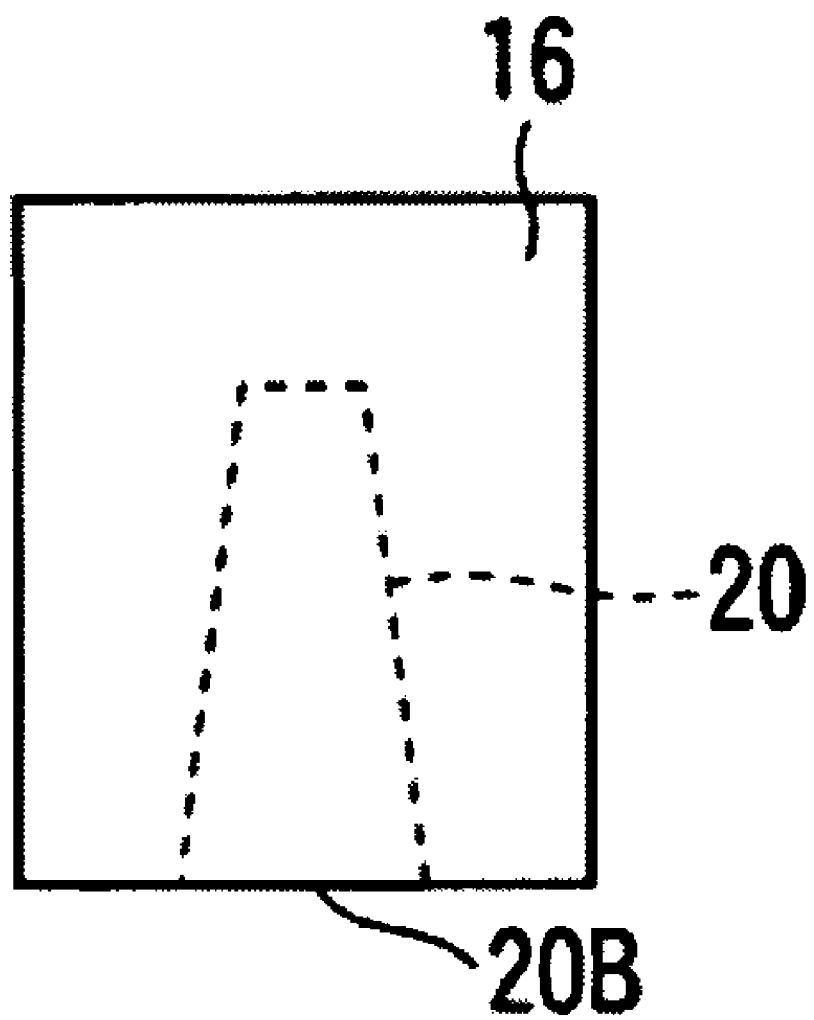
FIG. 12 is a top view for describing the feature of the optical waveguide in which the core section has the taper structure.

FIGS. 10 through 12 are views for describing an optical waveguide in which a core section has a taper structure. FIG. 10 is a side view of a feature of an optical waveguide in which a core section has a taper structure. FIG. 11 is a front view of the feature of the optical waveguide in which the core section has the taper structure. FIG. 12 is a top view of the feature of the optical waveguide in which the core section has the taper structure. In a core section 20 shown in FIGS. 10 through 12, an aperture 20A from which light is inputted is small and an aperture 20B from which light is outputted is large.

Figure 13:
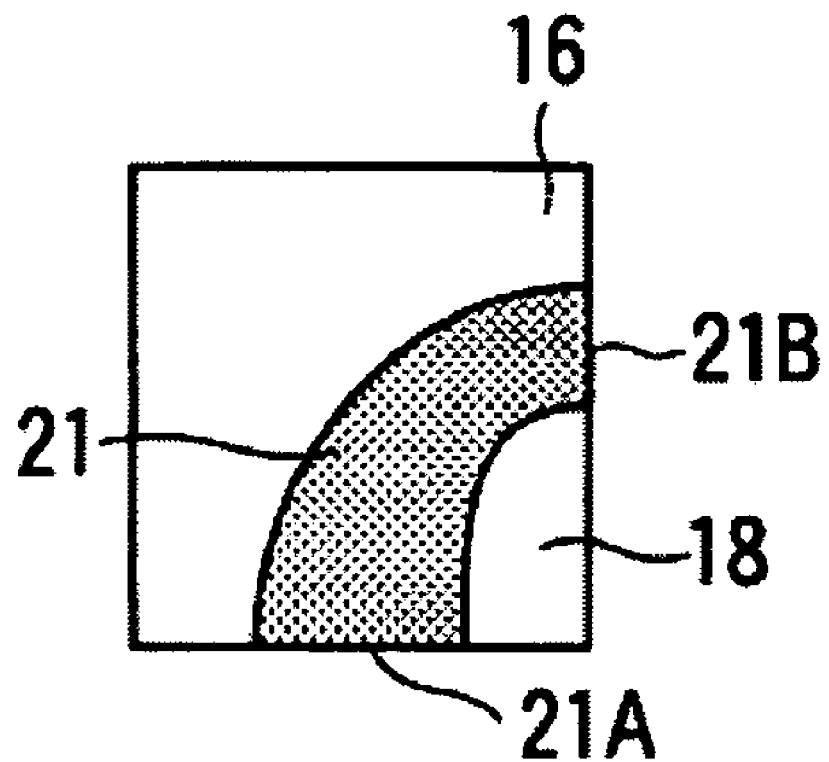
FIG. 13 is a side view for describing a feature of another optical waveguide in which a core section has a taper structure.
Figure 14:
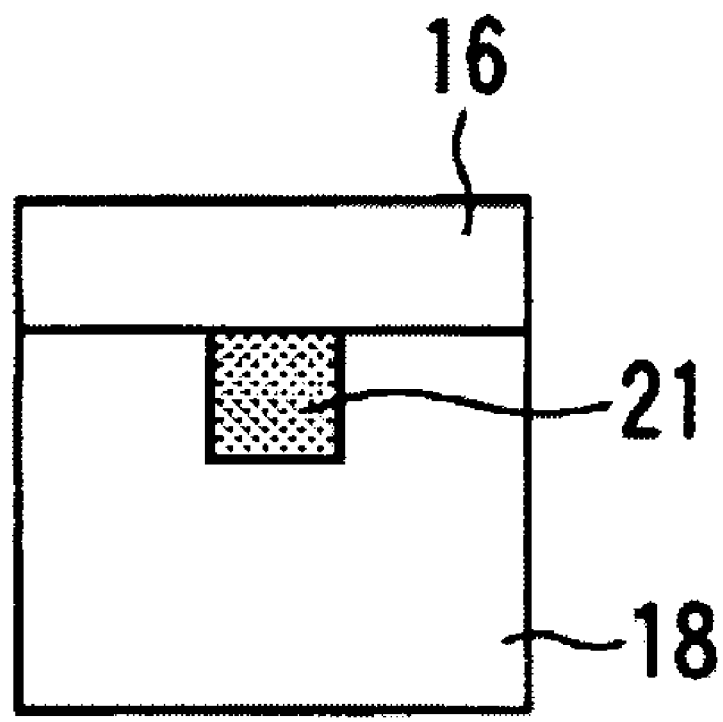
FIG. 14 is a front view for describing the feature of another optical waveguide in which the core section has the taper structure.
Figure 15:
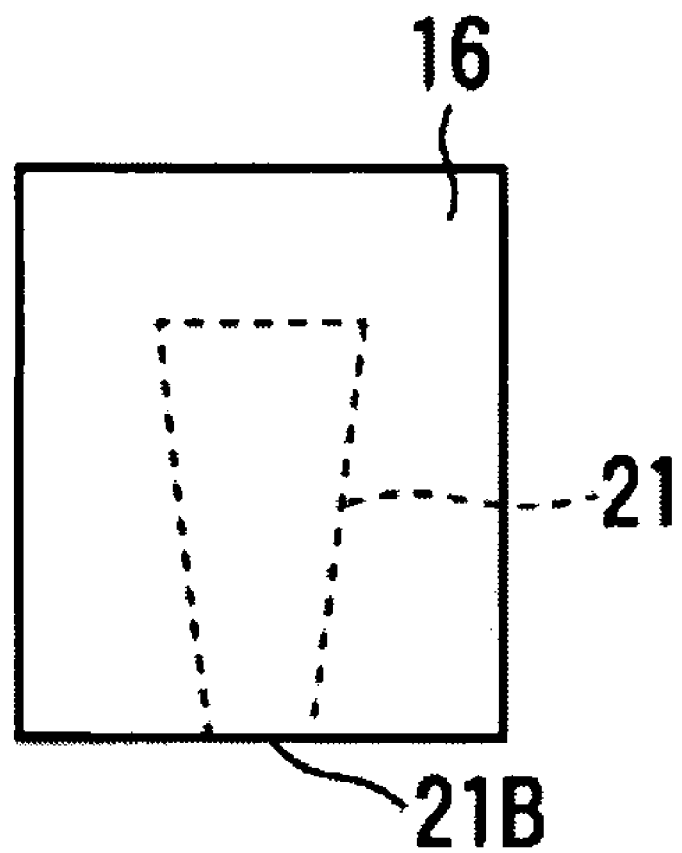
FIG. 15 is a top view for describing the feature of another optical waveguide in which the core section has the taper structure.

FIGS. 13 through 15 are views for describing another optical waveguide in which a core section has a taper structure. FIG. 13 is a side view of a feature of another optical waveguide in which a core section has a taper structure. FIG. 14 is a front view of the feature of another optical waveguide in which the core section has the taper structure. FIG. 15 is a top view of the feature of another optical waveguide in which the core section has the taper structure. In contrast with the core section 20 shown in FIGS. 10 through 12, in a core section 21 shown in FIGS. 13 through 15, an aperture 21A from which light is inputted is large and an aperture 21B from which light is outputted is small.

In FIGS. 10 through 15, the core sections having the taper structure have been described in detail, because these techniques are useful for forming a surface type optical device array or an optical transmission medium array.

Figure 16:
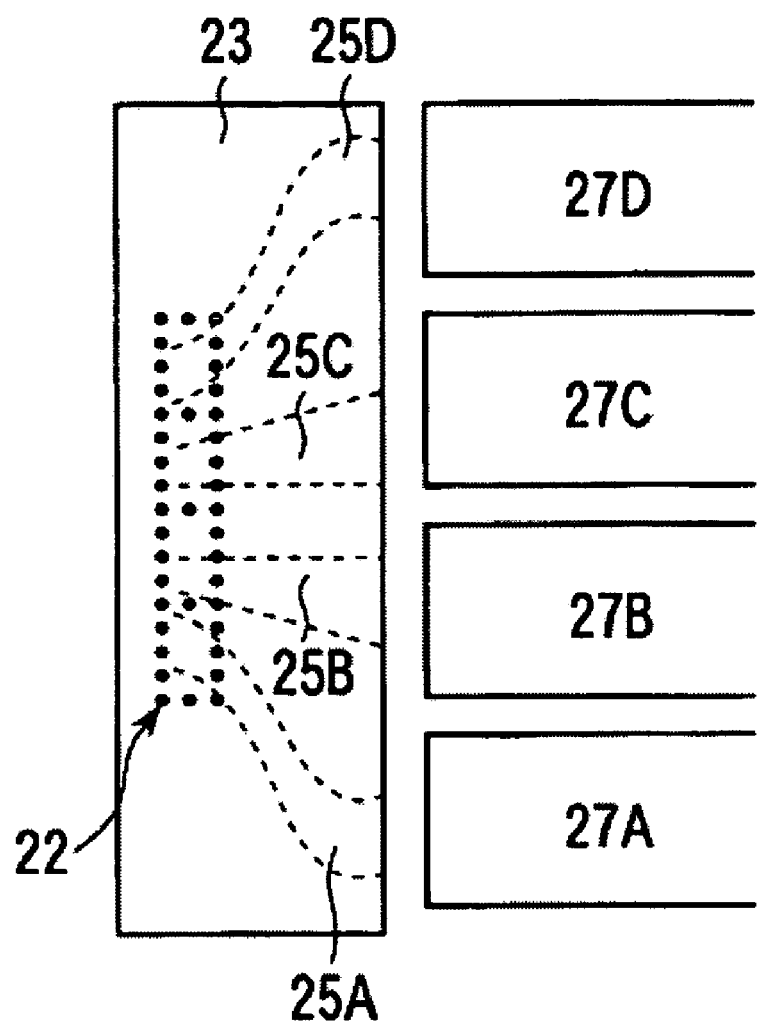
FIG. 16 is a top view showing a feature of an optical module including a surface type optical device array and a plastic fiber array.

FIG. 16 is a top view showing a feature of an optical module including a surface type optical device array and a plastic fiber array. In FIG. 16, a surface type optical device array 22 in which surface type optical devices are arranged at pitches of 250 μm, an optical waveguide 23, core sections 25A through 25D, and plastic fiber arrays 27A through 27D in which plastic fibers are arranged at pitches of 500 μm are shown.

Figure 17:
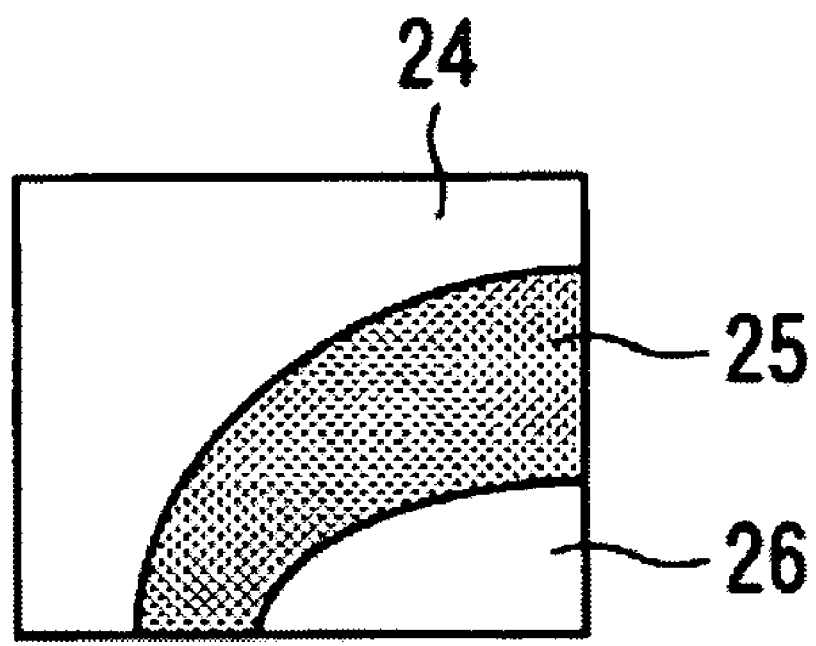
FIG. 17 is a side view showing a feature of the optical waveguide shown in FIG. 16.
Figure 18:
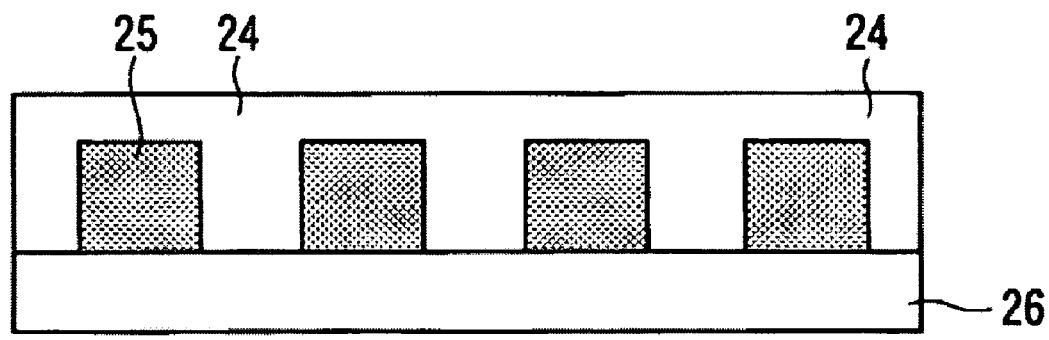
FIG. 18 is a front view showing the feature of the optical waveguide shown in FIG. 16.

FIG. 17 is a side view showing a feature of the optical waveguide shown in FIG. 16. FIG. 18 is a front view showing the feature of the optical waveguide shown in FIG. 16. In FIGS. 17 and 18, a first clad section 24, core sections 25, and a second clad section 26 are shown. The same symbols that are used in FIG. 16 indicate the same components or have the same meanings.

As stated above, even if the surface type optical device array differs from the optical transmission medium array in pitch, they can optically be coupled easily by using an optical waveguide having such a structure.

First Embodiment

Figure 19:
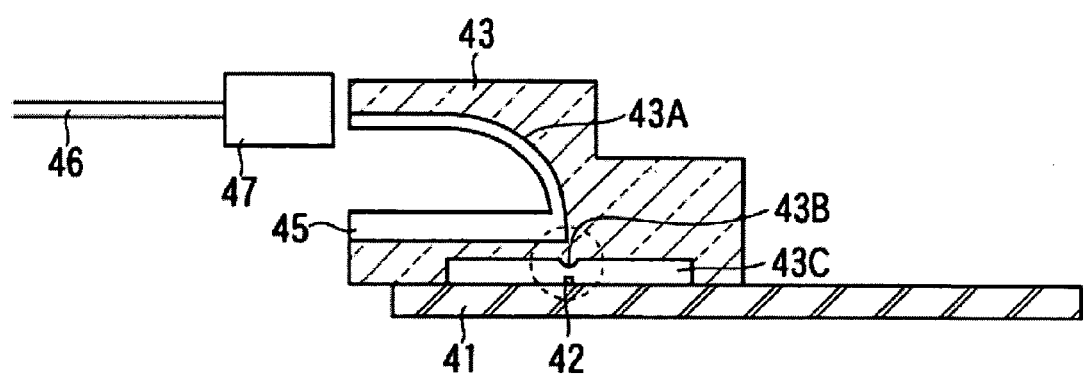
FIG. 19 is a sectional view of a feature of an optical module for describing an example of the first embodiment of the present invention.

FIG. 19 is a sectional view of a feature of an optical module for describing an example of the first embodiment of the present invention. In FIG. 19, a printed circuit board 41, a surface type optical device 42, such as a surface emitting laser diode or a photodiode, mounted on the printed circuit board 41, a first clad section 43, a curved surface 43A for turning the course of light gradually and squarely, a lens 43B, a concavity 43C formed in the under surface of the first clad section 43 to cover the surface type optical device 42, a second clad section 45, an optical fiber ribbon 46, and a mechanically transferable (MT) optical connector 47 are shown. A plurality of grooves (not shown) are formed in the direction in which light travels in the curved surface 43A and core sections are formed in these grooves.

Figure 20:
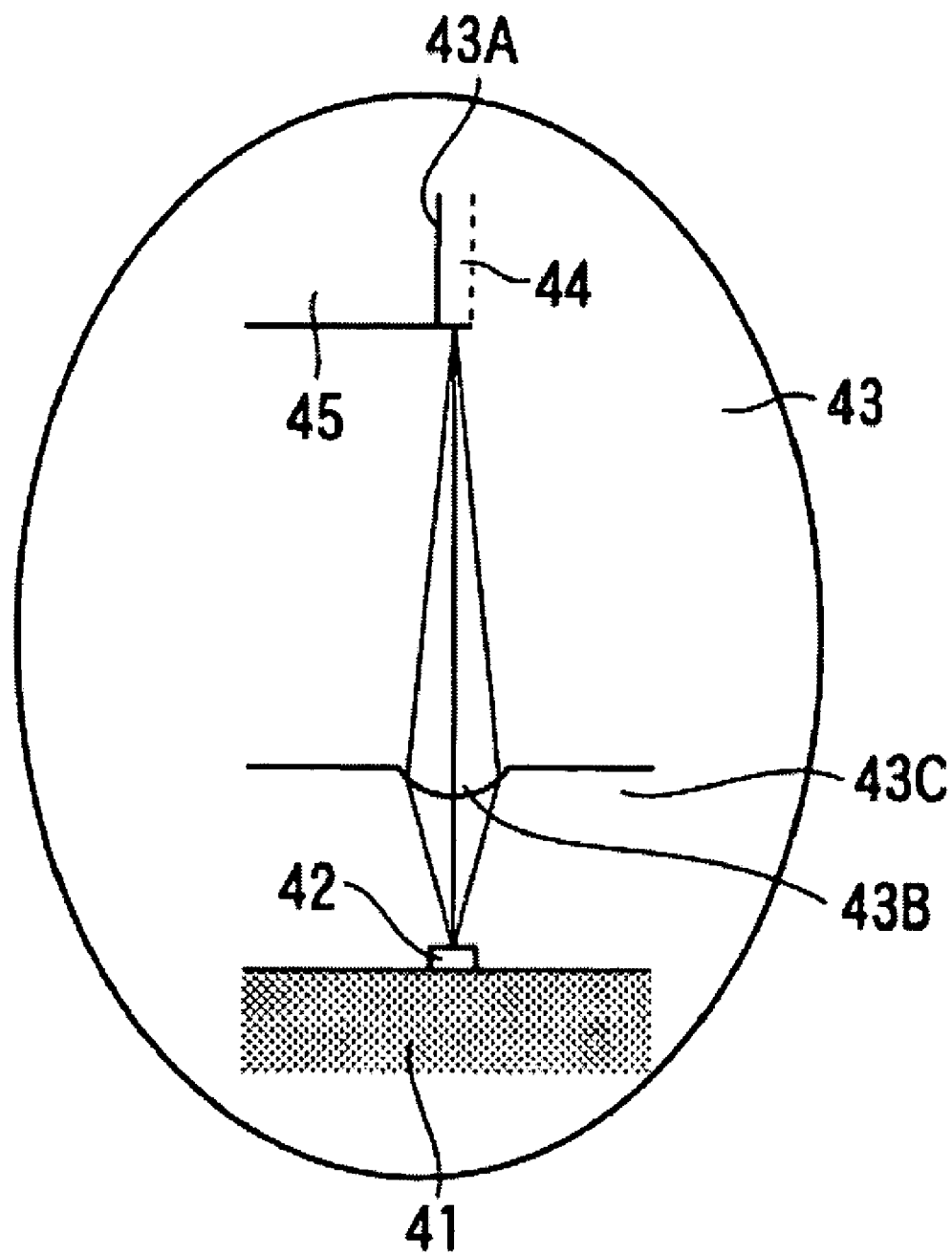
FIG. 20 is an enlarged sectional view of a portion enclosed by a dashed line in FIG. 19.

FIG. 20 is an enlarged sectional view of a portion enclosed by a dashed line in FIG. 19. The same symbols that are used in FIG. 19 indicate the same components or have the same meanings.

In FIG. 20, the lens 43B is formed on the bottom surface of the first clad section 43, that is to say, in an area opposite the surface type optical device 42. If the surface type optical device 42 is a surface emitting laser diode, then light outputted from the surface type optical device 42 is focused by the lens 43B and is inputted into a core section 44 embedded in the groove formed in the first clad section 43. An exposed surface of the core section 44 and the curved surface 43A of the first clad section 43 are covered with the second clad section 45 and are integrated.

Figure 21:
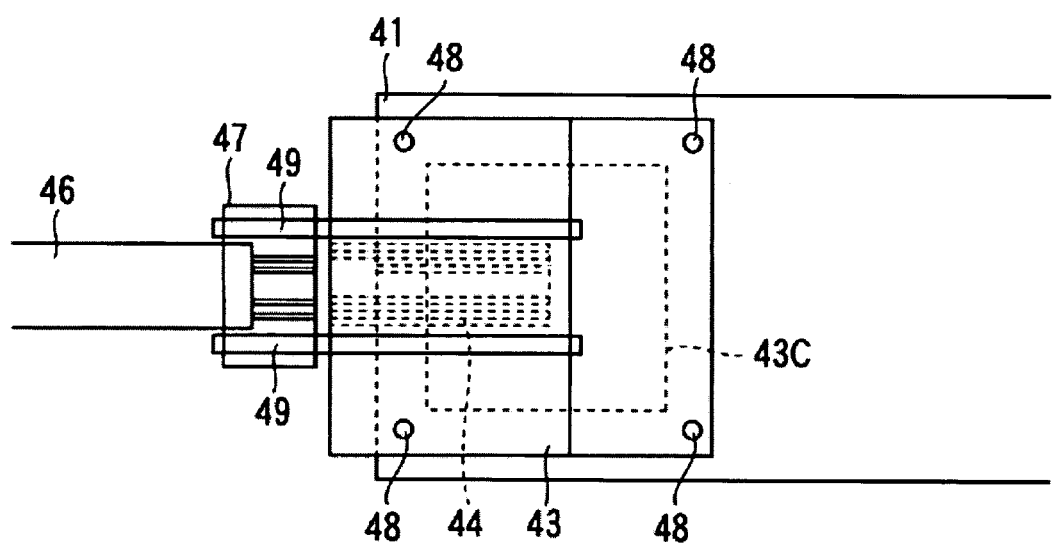
FIG. 21 is a top view showing the feature of the optical module shown in FIG. 19.

FIG. 21 is a top view showing the feature of the optical module shown in FIG. 19. The same symbols that are used in FIGS. 19 and 20 indicate the same components or have the same meanings.

The first clad section 43 in the optical waveguide according to the first embodiment of the present invention is fixed onto the printed circuit board 41 by feeding alignment pins 48 through alignment pin holes made in the first clad section 43 and the printed circuit board 41. As a result, the surface type optical device 42 can be opposed easily and accurately to the lens 43B. In addition, the MT optical connector 47 to which the optical fiber ribbon 46 is connected is fixed to the first clad section 43 by feeding alignment pins 49 through alignment pin holes made in the first clad section 43 and the MT optical connector 47. As a result, the optical fiber ribbon 46 can be opposed easily and accurately to the core section 44.

Figure 22:
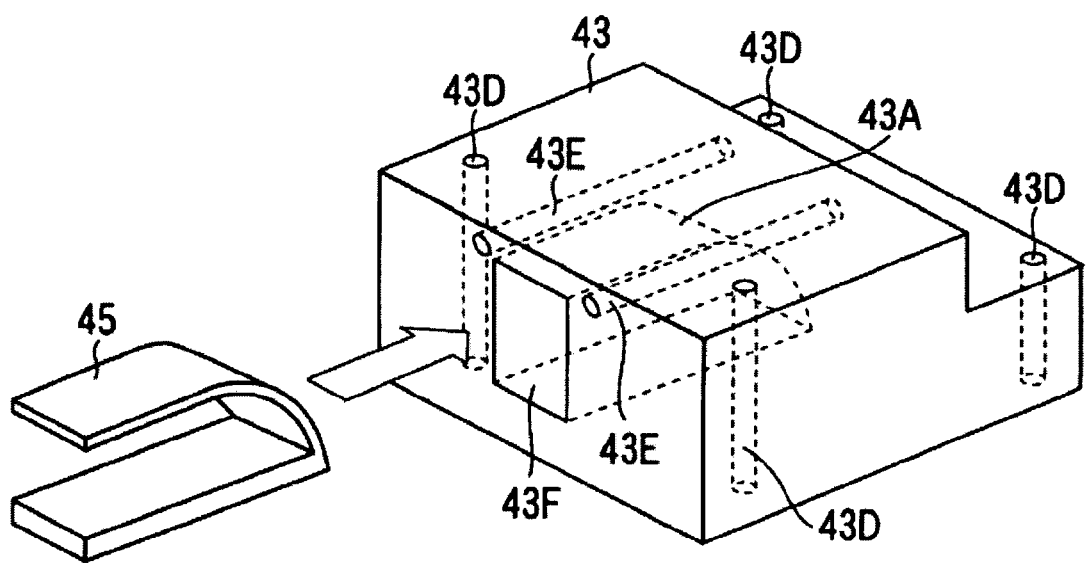
FIG. 22 is an exploded perspective view for describing how to assemble the optical waveguide, being the example of the first embodiment of the present invention.

FIG. 22 is an exploded perspective view for describing how to assemble the optical waveguide, being the example of the first embodiment of the present invention. The same symbols that are used in FIGS. 19 through 21 indicate the same components or have the same meanings.

As can be seen from FIG. 22, alignment pin holes 43D through which the alignment pins 48 shown in FIG. 21 are fed, alignment pin holes 43E through which the alignment pins 49 shown in FIG. 21 are fed, and a fitting hole 43F into which the second clad section 45 is fitted are made in the first clad section 43.

A plurality of grooves (not shown) in which the core sections 44 are to be embedded are formed in the curved surface 43A of the first clad section 43. These grooves extend downward from the entrance of the fitting hole 43F. These grooves are filled in with a liquid ultraviolet-cured resin, then the second clad section 45 is fitted into the fitting hole 43F.

Figure 23:
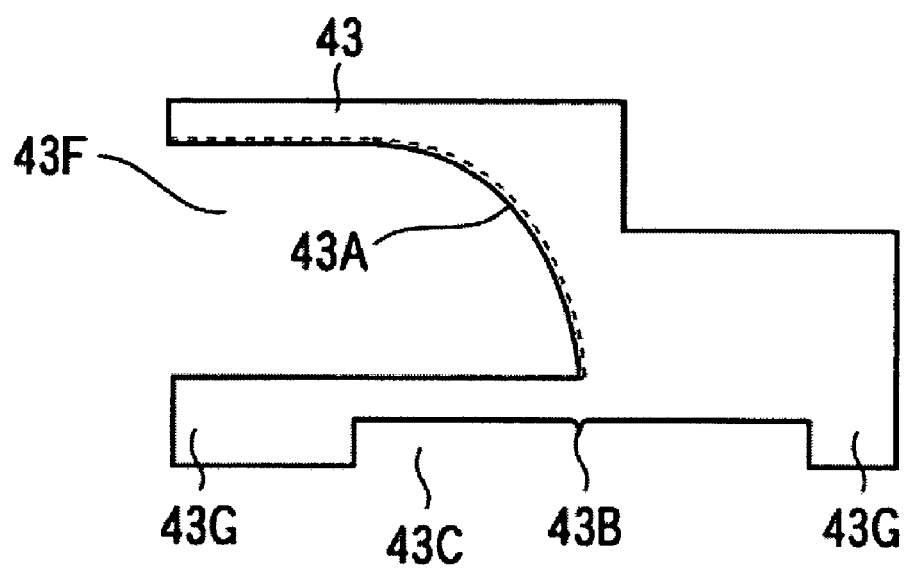
FIG. 23 is a sectional view for describing a feature of the structure of the first clad section in detail.
Figure 24:
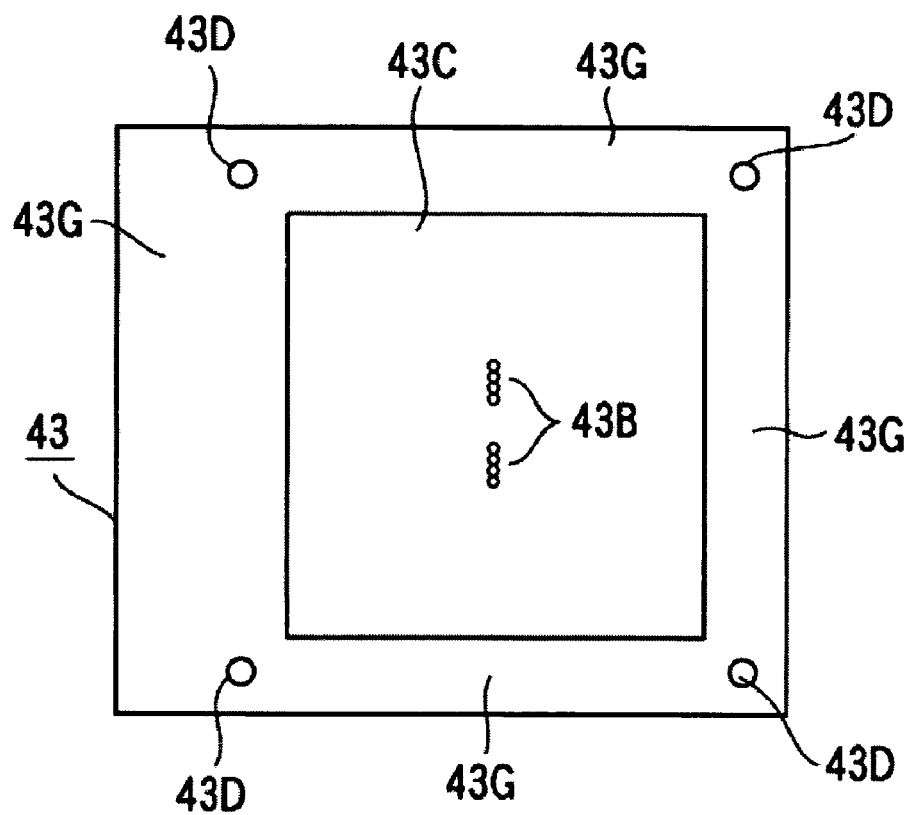
FIG. 24 is a bottom view for describing the feature of the structure of the first clad section in detail.
Figure 25:
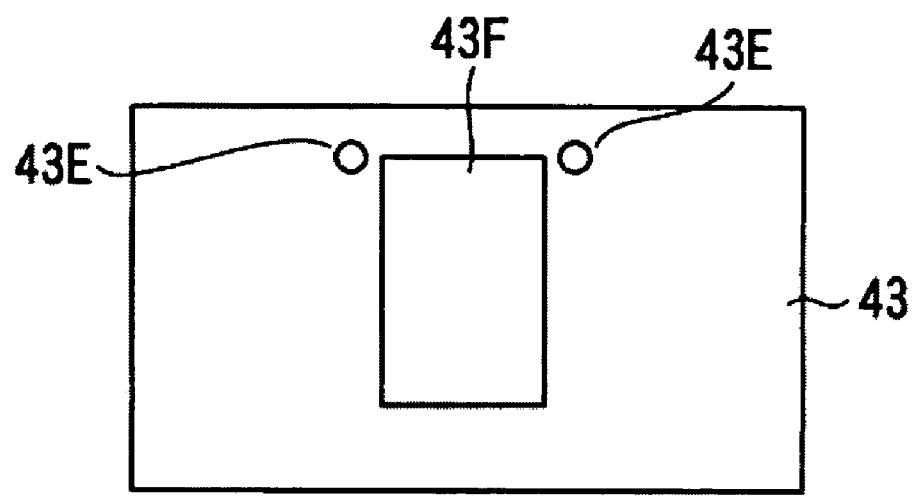
FIG. 25 is a front view for describing the feature of the structure of the first clad section in detail.
Figure 26:
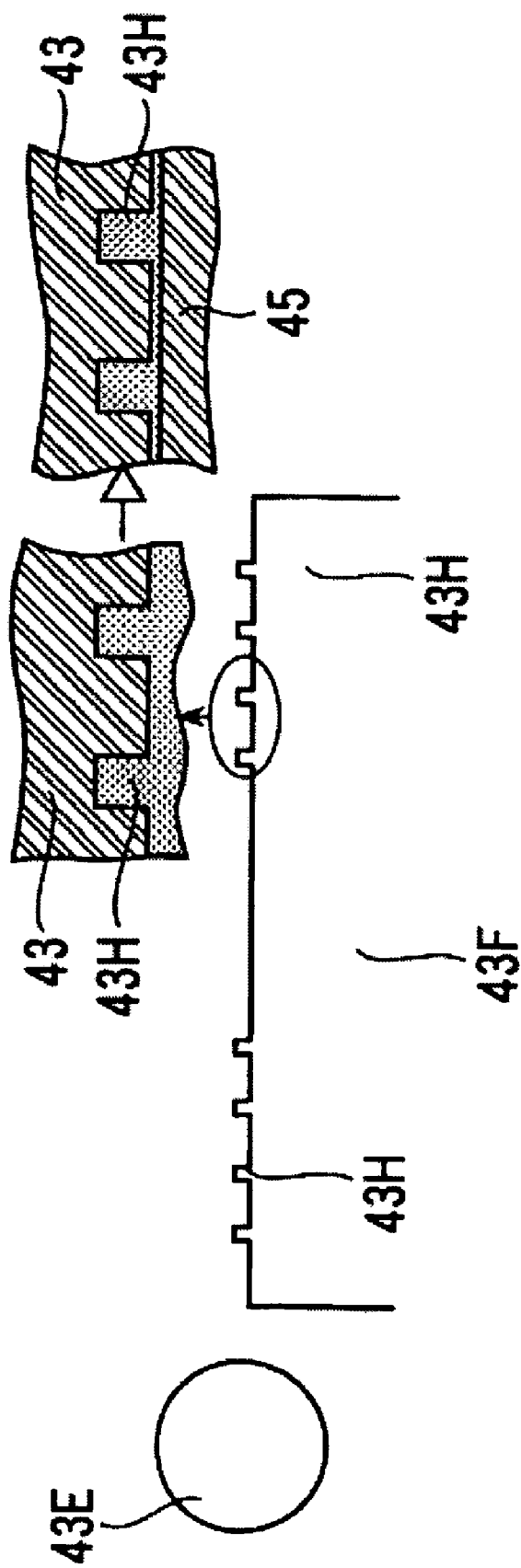
FIG. 26 is an enlarged front view for describing the feature of the structure of the first clad section in detail.

FIG. 23 is a sectional view for describing a feature of the structure of the first clad section in detail. FIG. 24 is a bottom view for describing the feature of the structure of the first clad section in detail. FIG. 25 is a front view for describing the feature of the structure of the first clad section in detail. FIG. 26 is an enlarged front view for describing the feature of the structure of the first clad section in detail. The same symbols that are used in FIGS. 19 through 22 indicate the same components or have the same meanings.

As can be seen from FIGS. 23 and 24, the concavity 43C is formed in the under surface of the first clad section 43. Accordingly, the concavity 43C is surrounded by a wall 43G. When the first clad section 43 is fitted on the printed circuit board 41, a sealing structure that prevents the surface type optical device 42 from being influenced by dust or the like from the outside is realized by the wall 43G.

As can be seen from FIG. 24, the alignment pin holes 43D are made in the wall 43G. In the concavity 43C, the lenses 43B are formed at appropriate positions opposite the grooves in which the core sections 44 are to be embedded.

As can be seen from FIG. 25, the fitting hole 43F into which the second clad section 45 is fitted is made in the front of the first clad section 43. The alignment pin holes 43E are made at appropriate positions around the fitting hole 43F. In FIG. 26, the immediate vicinity of the fitting hole 43F is enlarged. From FIG. 26 it can be seen that grooves 43H in which the core sections 44 are to be embedded are formed in the surface on the fitting hole 43F of the first clad section 43.

To make the first clad section 43 described above, a metal mold for injection molding having portions corresponding to the grooves in which the core sections 44 with a 50-by-50 micron cross section and a radius of curvature of 10 mm are embedded, portions corresponding to the alignment pin holes with a diameter of 700 μm, portions corresponding to the lenses 43, and the like is filled in with a molten thermoplastic resin (polyolefin resin) with a refractive index of 1.50 and injection molding is performed.

To make the second clad section 45, a V-shaped metal mold for injection molding having a curved surface with a radius of curvature of 10 mm corresponding to the curved surface in which the core sections 44 are formed is filled in with a molten thermoplastic resin (polyolefin resin) with a refractive index of 1.50 and injection molding is performed.

The grooves 43H in the first clad section 43 made in the above way are filled in with a liquid ultraviolet-cured resin (epoxy resin, acrylic resin, or the like) with a refractive index of 1.55 as a core material. Subsequently, by fitting the second clad section 45 into the fitting hole 43F, the grooves 43H are fully filled in with the liquid ultraviolet-cured resin.

The second clad section 45 is inserted into the fitting hole 43F made in the first clad section 43. Then the core material is irradiated with ultraviolet rays to cure it. As a result, the core sections 44 are formed, the second clad section 45 adheres to the first clad section 43, and the optical waveguide is completed.

This will be described in further detail. When the second clad section 45 is inserted into the fitting hole 43F made in the first clad section 43, the core material in the grooves 43H is forced further into the inside by the second clad section 45. As a result, the grooves 43H are fully filled in with the core material. The remaining core material is spread thin by the second clad section 45 and helps to adhere the second clad section 45 to the first clad section 43.

The optical waveguide fabricated in the above way is fixed onto the printed circuit board 41 on which the surface type optical device 42 is mounted and in which the alignment pin holes are made by the use of the alignment pins 48. The MT optical connector 47 to which the optical fiber ribbon 46 is connected is fixed to the front of the optical waveguide by the use of the alignment pins 49. By doing so, the optical module is completed.

A second embodiment of the present invention will now be described.

Figure 27:
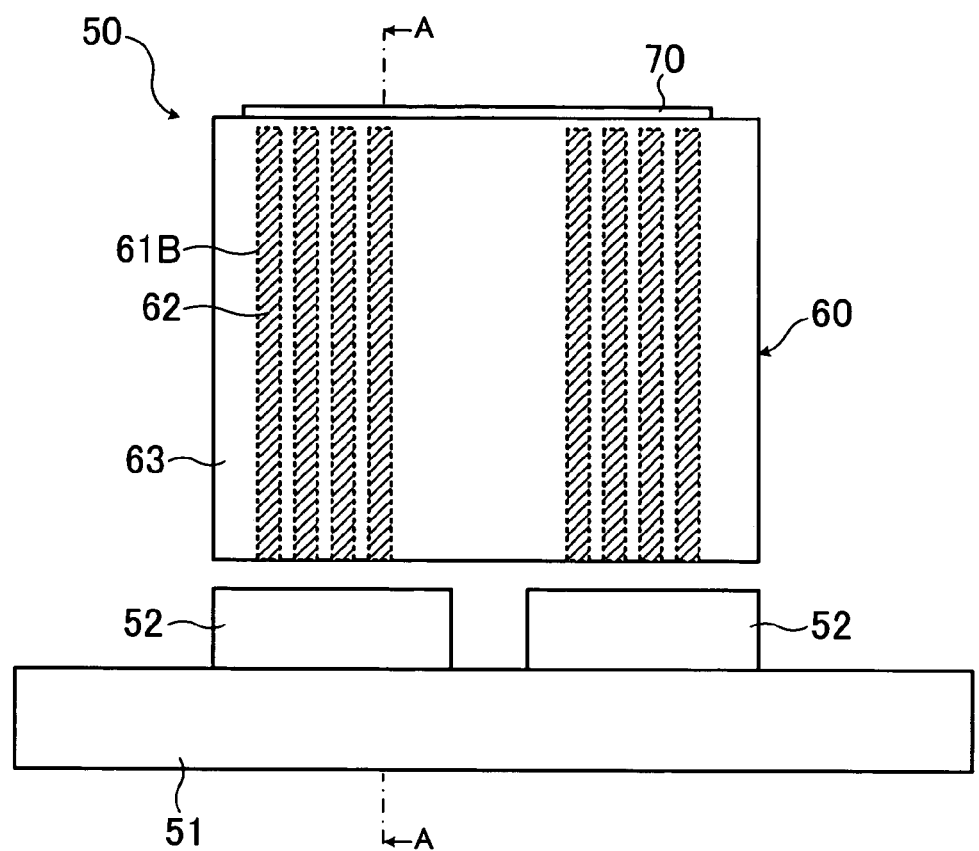
FIG. 27 is a front view of a feature of an optical module using an optical waveguide structure according to a second embodiment of the present invention.
Figure 28:
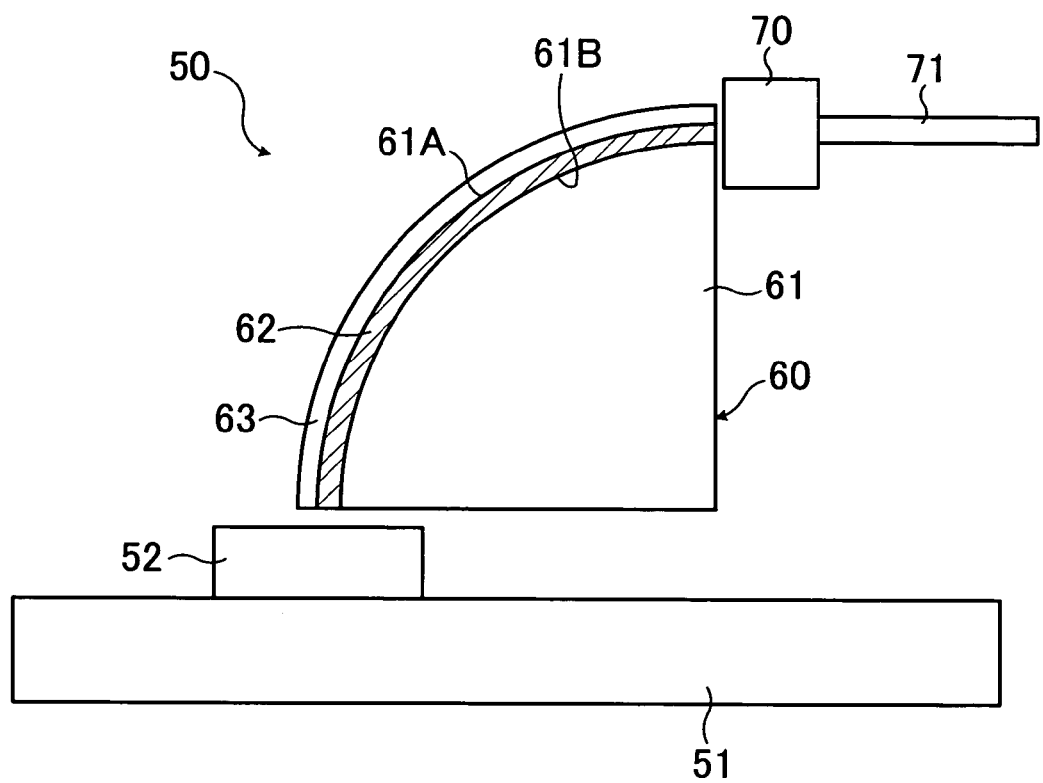
FIG. 28 is a sectional view taken along lines A-A of FIG. 27.
Figure 29:
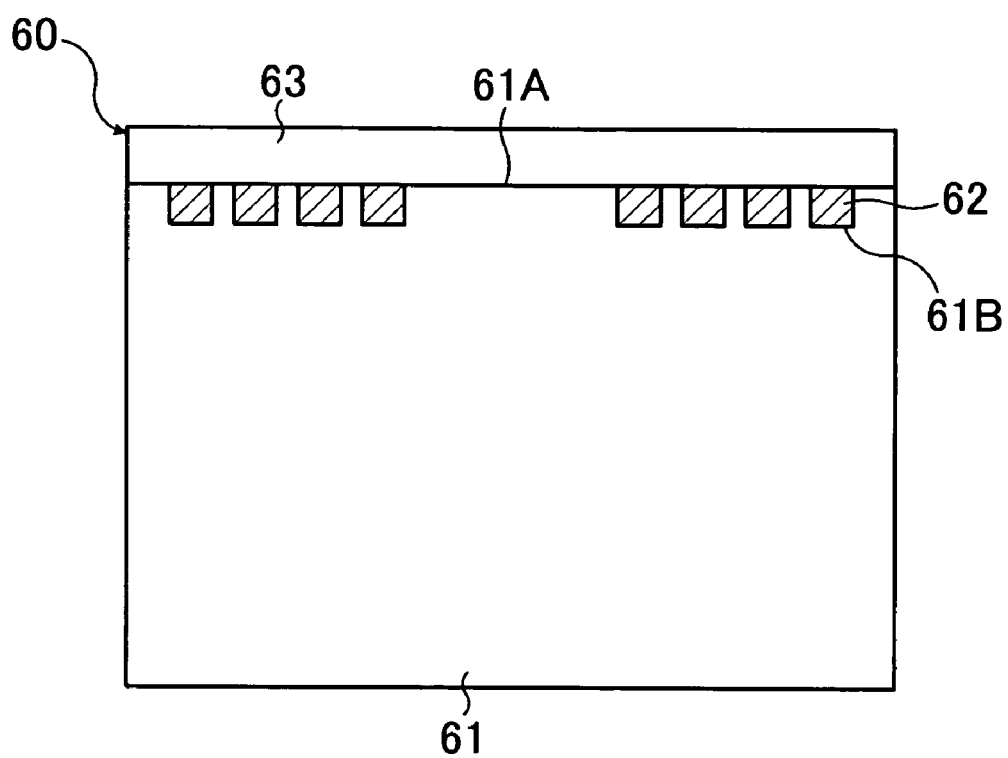
FIG. 29 is a sectional view taken in the direction of the depth of the core section shown in FIG. 27.

FIG. 27 is a front view of a feature of an optical module using an optical waveguide structure according to a second embodiment of the present invention. FIG. 28 is a sectional view taken along lines A-A of FIG. 27. FIG. 29 is a sectional view taken in the direction of the depth of the core section shown in FIG. 27.

An optical module 50 shown in FIGS. 27 and 28 comprises a printed circuit board 51, two surface type optical devices 52 mounted on the printed circuit board 51, and an optical waveguide structure 60. The optical waveguide structure 60 has a guide structure (not shown) on the bottom. The optical waveguide structure 60 is fixed onto the printed circuit board 51 with the surface type optical devices 52 fitted into the guide structure.

The optical waveguide structure 60 includes a first clad section 61, core sections 62 which are formed like an array by the use of a transparent material with a refractive index higher than that of the first clad section 61 and through which light propagates, and a second clad section 63 which covers the first clad section 61 and the core sections 62. A cross section of the first clad section 61 perpendicular to the printed circuit board 51 onto which the optical waveguide structure 60 is fixed has a curved surface which curves like an arc. As can be seen from FIG. 29, in the optical waveguide structure 60 according to the second embodiment of the present invention, grooves 61B which extend along the curved surface are formed in a convex surface 61A of the first clad section 61 and the core sections 62 are formed in the grooves 61B.

As described above, in the optical waveguide structure 60 according to the second embodiment of the present invention, the grooves 61B are formed in the convex surface 61A which curves like an arc, and the core sections 62 are formed in the grooves 61B. The second embodiment of the present invention differs from the first embodiment of the present invention in this respect. In the first embodiment of the present invention, the groove 16D is formed in the concave surface (curved surface 16C) of the first clad section 16 and the core section 17 is formed there.

The first clad section 61 of the optical waveguide structure 60 can be formed with a mold. For example, first a clad material is formed into the first clad section 61 having the grooves 61B by the use of a metal mold which consists of a first block having convex portions corresponding to the core sections 62 and a second block having a structure corresponding to the first block. Then the core sections 62 are formed by filling in the grooves 61B in the first clad section 61 with a transparent material with a refractive index higher than that of the clad material. Finally the second clad section 63 is formed on the first clad section 61 and the core sections 62 by, for example, sticking a film-like clad material. As a result, the optical waveguide structure 60 is formed. The optical waveguide structure 60 can be formed easily by using such a molding technique.

The first clad section 61 can be formed by injection molding, press molding, or the like. However, injection molding is preferable from the viewpoint of productivity. Moreover, mechanical cutting, laser abrasion, sandblast, a plasma process, and the like may be combined. In addition, a transparent solid material, such as plastic, glass, or quartz, can be used for fabricating the optical waveguide structure 60. The clad material and the core material are selected from among them with their refractive indexes taken into consideration. Plastic or low-melting-point glass is preferable from the viewpoint of molding. This is the same with the above first embodiment.

The optical waveguide structure 60 includes the two surface type optical devices 52 and four core sections 62 are formed for each surface type optical device. That is to say, a total of eight core sections 62 are formed. However, the total number of the core sections 62 is not limited to eight. In this case, the optical waveguide structure 60 is fixed onto the printed circuit board 51 so that one end portion of each core section 62 will be just above the surface type optical device 52 and so that the other end portion will be nearly parallel to the printed circuit board 51.

The surface type optical device 52 is a surface type light-emitting element, such as a surface emitting laser diode, or a surface type light-receiving element, such as a photodiode. For example, a surface type light-emitting element can be used as one of the two surface type optical devices 52 and a surface type light-receiving element can be used as the other. In this case, the optical module 50 will function as a transmitter-receiver module. Moreover, surface type light-emitting elements may be used as the two surface type optical devices 52 to make the optical module 50 function as a transmitter module, or surface type light-receiving elements may be used as the two surface type optical devices 52 to make the optical module 50 function as a receiver module. The number of the surface type optical devices 52 is not limited to two. The number of the core sections 62 can be changed properly according to the number or type of the surface type optical devices 52.

In the optical module 50, an optical connector 70 is located at the other end of each core section 62. An optical fiber 71 is connected to the optical connector 70. If the surface type optical device 52 is a surface type light-emitting element, then light outputted from the surface type light-emitting element is inputted to each core section 62, the direction in which the light travels is changed here, and the light is outputted to the optical fiber 71. If the surface type optical device 52 is a surface type light-receiving element, then light outputted from the optical fiber 71 is inputted to each core section 62, the direction in which the light travels is changed here, and the light is outputted to the surface type light-receiving element.

The optical waveguide structure 60 used in the optical module 50 having such a structure does not need a highly accurate mirror which has been needed in a conventional optical module. In addition, lenses can integrally be formed at need. Therefore, there is no need to adjust an optical axis. As a result, the optical waveguide structure 60 functions in the optical module 50 as a simple deflecting optical system which can optically couple the surface type optical device 52 and the optical fiber 71 while turning the course of light almost squarely and which can easily fabricated.

An optical waveguide structure having lenses will now be described.

Figure 30:
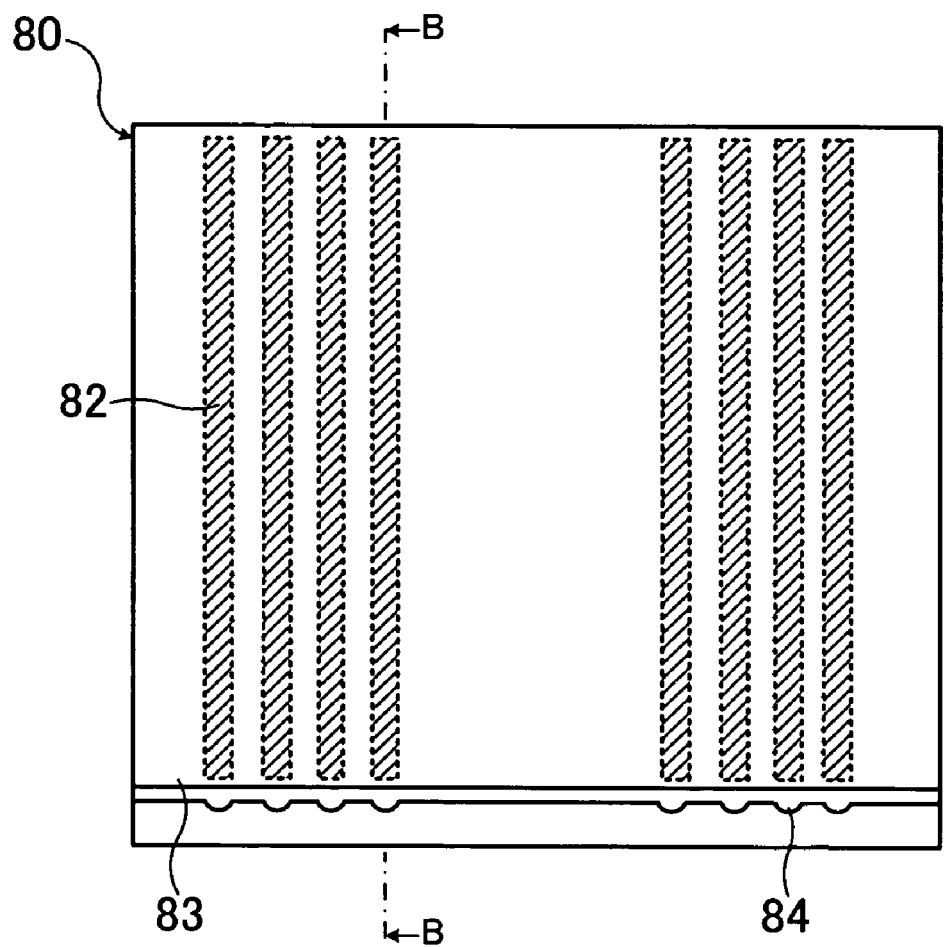
FIG. 30 is a front view of a feature of an optical waveguide structure into which lenses are integrated.
Figure 31:
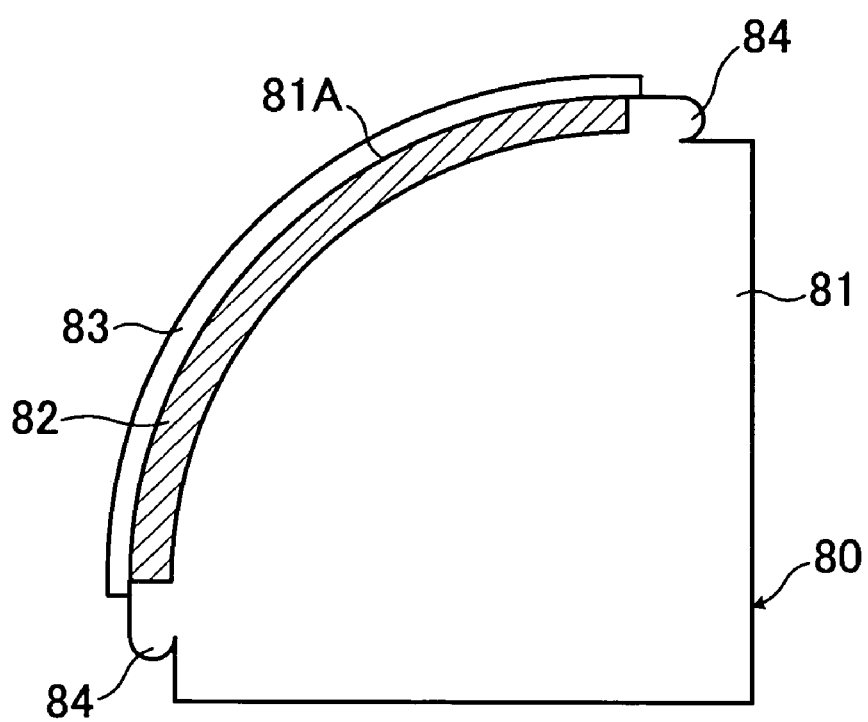
FIG. 31 is a sectional view taken along lines B-B of FIG. 30.

FIG. 30 is a front view of a feature of an optical waveguide structure into which lenses are integrated. FIG. 31 is a sectional view taken along lines B-B of FIG. 30.

An optical waveguide structure 80 shown in FIGS. 30 and 31 includes eight core sections 82 which form an array in a convex surface 81A of a first clad section 81 a cross section of which is like an arc. Moreover, the optical waveguide structure 80 includes lenses 84 which are integrated into the first clad section 81 and which are located opposite both ends of each core section 82. The optical waveguide structure 80 having such a structure is located in an optical module so that each lens 84 will be directly opposite to the light-receiving surface or light-emitting surface of a surface type optical device or an end of an optical fiber core from which light is outputted or an end of an optical fiber core into which light is inputted.

By forming the lenses 84, light inputted from the surface type light-emitting device or the optical fiber into the core sections 82 can be focused by the lenses 84 or light outputted from the core sections 82 to the surface type light-receiving device or the optical fiber can be focused by the lenses 84. This reduces optical coupling loss.

As described above, with the optical waveguide structure 60 according to the second embodiment of the present invention, the core sections 62 which propagate light are formed in the convex surface 61A of the first clad section 61 which curves. The first clad section 61 and the core sections 62 are covered with the second clad section 63. As a result, light can be propagated directly and efficiently between the surface type optical device and the optical transmission medium. With the optical waveguide structure 80 according to the second embodiment of the present invention, the core sections 82 which propagate light are formed in the convex surface 81A of the first clad section 81 which curves. The first clad section 81 and the core sections 82 are covered with the second clad section 83. As a result, light can be propagated efficiently between the surface type optical device and the optical transmission medium via the lenses 84. The lenses 84 may be located only opposite one end of the core sections 82. As described above, however, to reduce optical coupling loss which occurs between the surface type optical device and the optical transmission medium, it is preferable that the lenses 84 should be located opposite both ends of the core sections 82.

In addition, in the optical waveguide structure according to the second embodiment of the present invention, each core section may have a taper structure or pitches at which the core sections are arranged at one end may be different from pitches at which the core sections are arranged at the other end. This is the same with the above first embodiment of the present invention.

Figure 32:
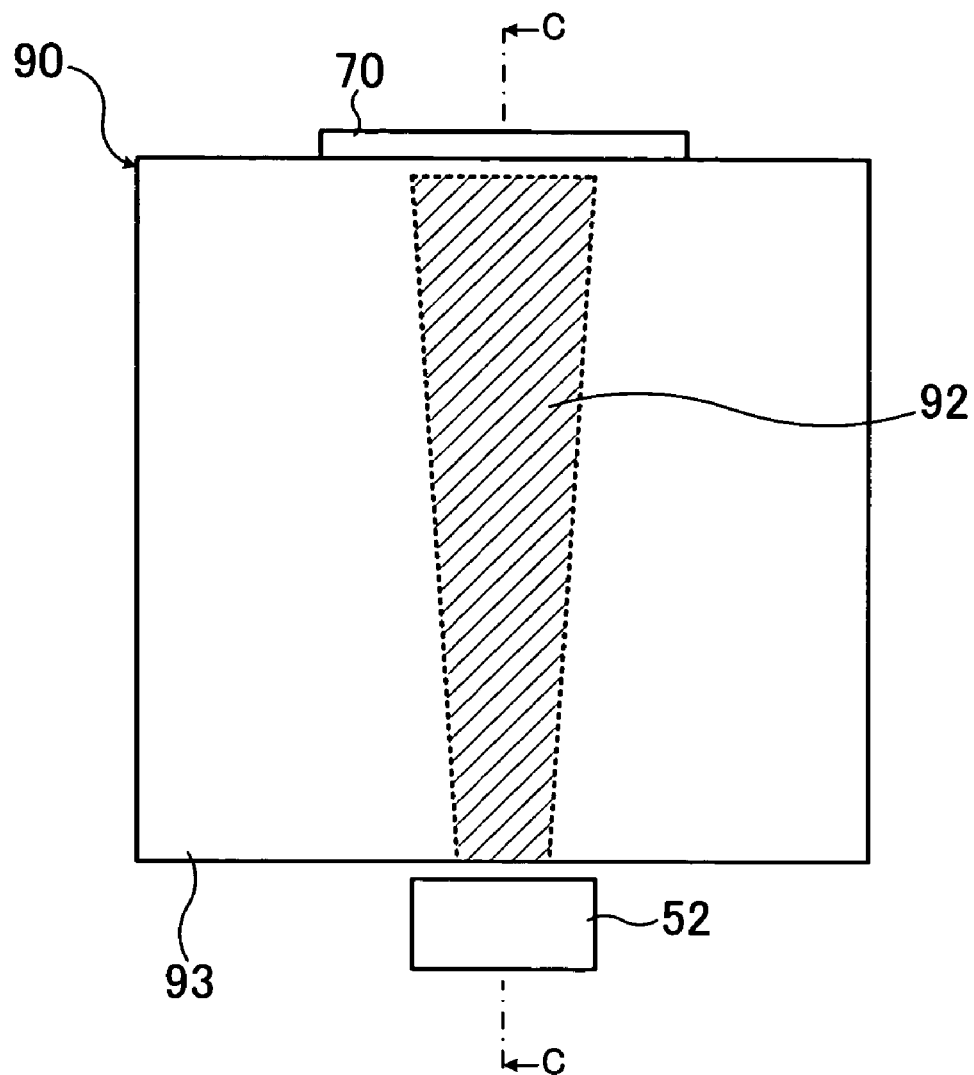
FIG. 32 is a front view of a feature of an optical waveguide structure in which a core section has a taper structure.
Figure 33:
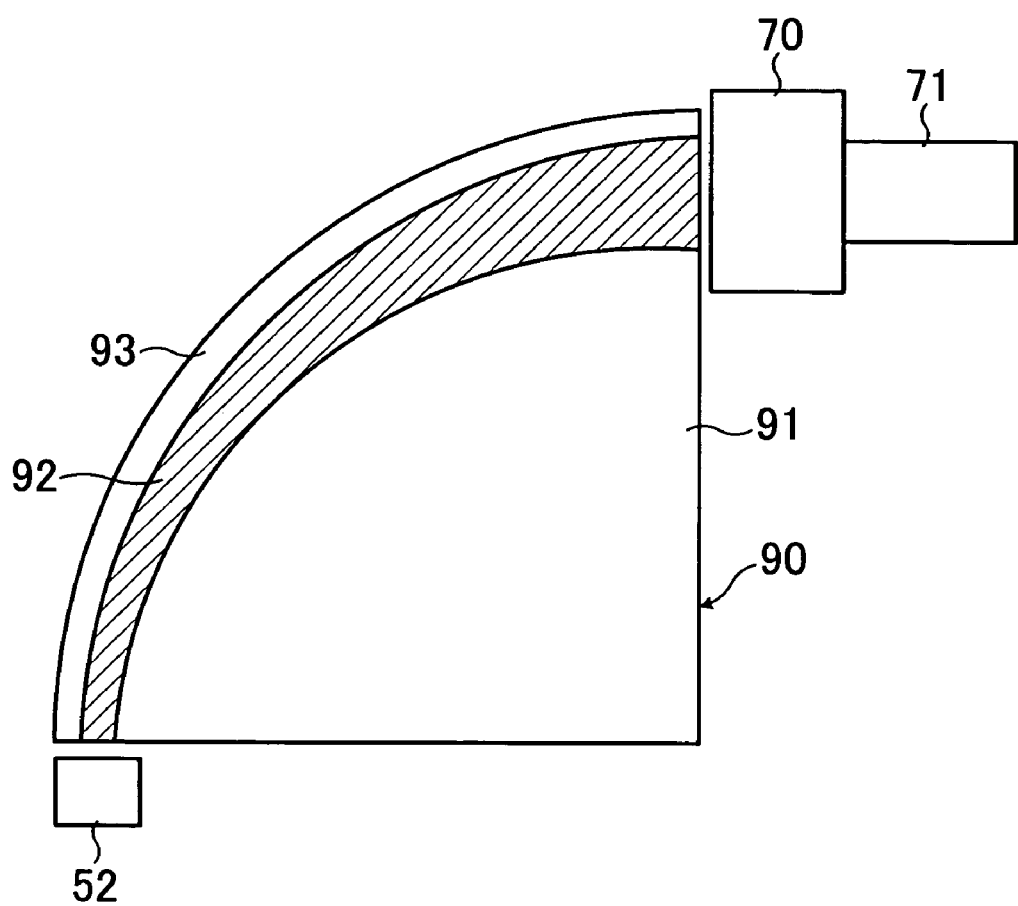
FIG. 33 is a sectional view taken along lines C-C of FIG. 32.

FIG. 32 is a front view of a feature of an optical waveguide structure in which a core section has a taper structure. FIG. 33 is a sectional view taken along lines C-C of FIG. 32. The same symbols that are used in FIGS. 27 and 28 indicate the same components or have the same meanings.

In an optical waveguide structure 90 shown in FIGS. 32 and 33, a core section 92 between a first clad section 91 and a second clad section 93 has a taper structure the cross-sectional area of which gradually changes in the direction in which light propagates. Such a taper structure will be adopted in, for example, a case where the size of a light-receiving area or a light-emitting area on a surface type optical device 52 does not match the diameter of a core of an optical fiber 71 or the size of an aperture of an optical connector 70. In this example, the diameter of the core of the optical fiber 71 is larger than the size of the light-receiving area or the light-emitting area on the surface type optical device 52 and the cross-sectional area of the core section 92 gradually increases from the surface type optical device 52 side to the optical fiber 71 side. This reduces optical coupling loss which occurs between the surface type optical device 52 and the optical fiber 71.

In this example, the surface type optical device 52 and the optical fiber 71 are optically coupled by the optical waveguide structure 90. However, the optical waveguide structure 90 having such a structure can also be applied to a case where optical fibers with different core diameters are optically coupled together. This reduces optical coupling loss caused by the difference in core diameter.

Figure 34:
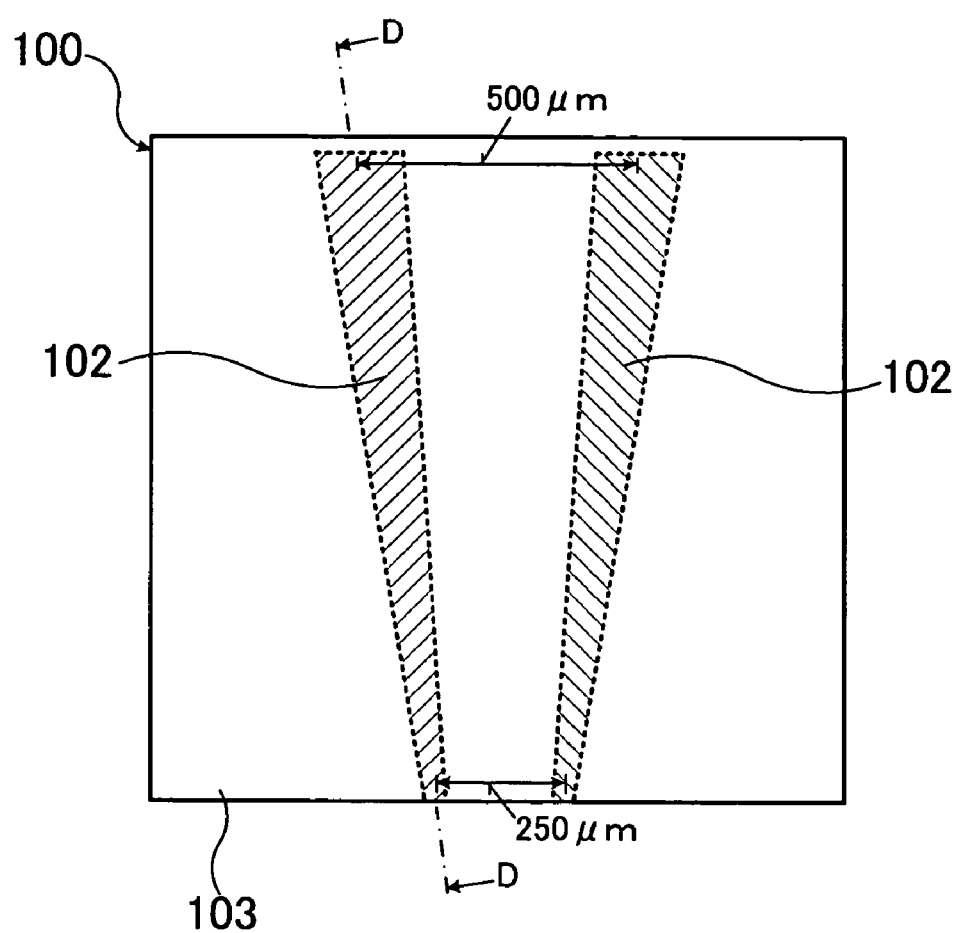
FIG. 34 is a front view of a feature of an optical waveguide structure in which a pitch at one end of core sections is different from a pitch at the other end of the core sections.
Figure 35:
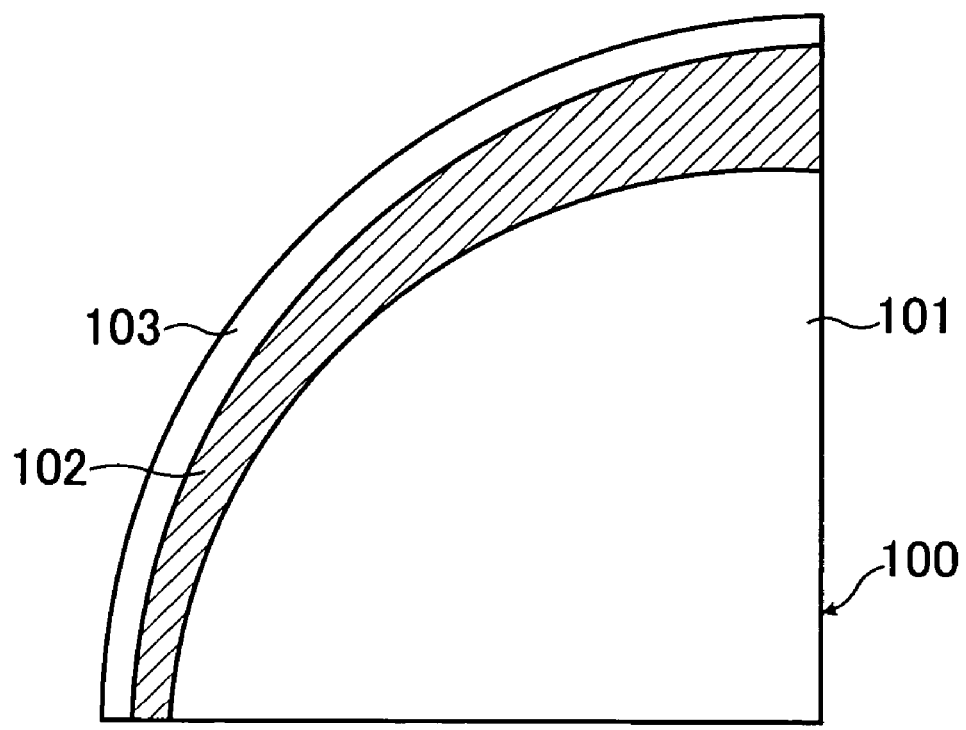
FIG. 35 is a sectional view taken along lines D-D of FIG. 34.

FIG. 34 is a front view of a feature of an optical waveguide structure in which a pitch at one end of core sections is different from a pitch at the other end of the core sections. FIG. 35 is a sectional view taken along lines D-D of FIG. 34.

In an optical waveguide structure 100 shown in FIGS. 34 and 35, core sections 102 between a first clad section 101 and a second clad section 103 are formed so that a pitch will be 250 μm at one end and 500 μm at the other end. Moreover, each core section 102 has a taper structure the cross-sectional area of which gradually increases from one end to the other end.

The optical waveguide structure 100 having such a structure can be applied to, for example, a case where surface type optical devices are arranged at pitches of 250 μm and where optical fiber cores are arranged at pitches of 500 μm. As a result, arrays which differ in pitch in their standard specifications can optically coupled together easily at a light loss. For example, a surface type laser diode array in which surface type laser diodes are arranged at pitches of 250 μm and a plastic fiber array in which plastic fibers are arranged at pitches of 500 μm can optically coupled together easily at a light loss.

In this example, each core section 102 has a taper structure. However, the width of each core section 102 may be constant. In that case, there is only a difference in pitch at both ends of the core sections.

Figure 36:
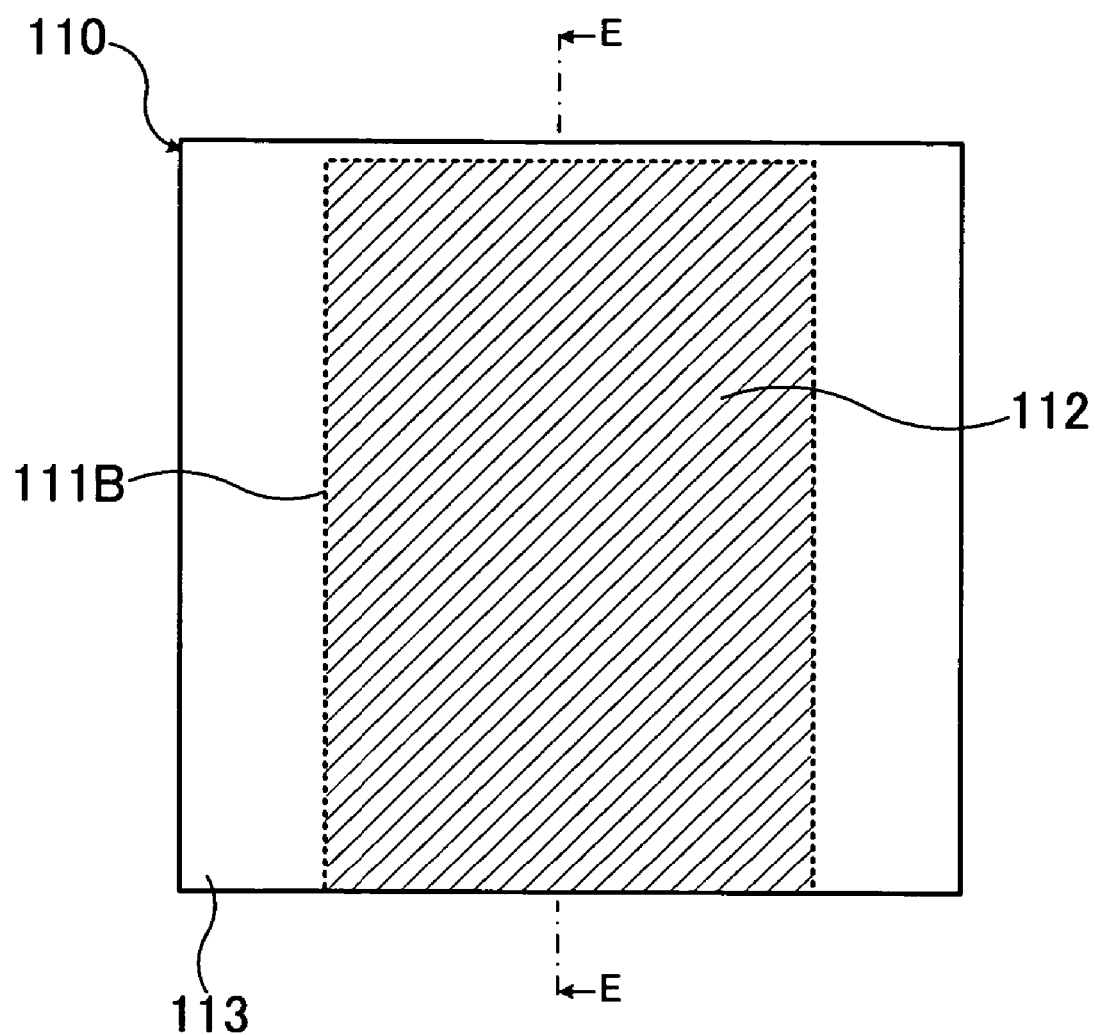
FIG. 36 is a front view of a feature of an optical waveguide structure in which a core section has a slab structure.
Figure 37:
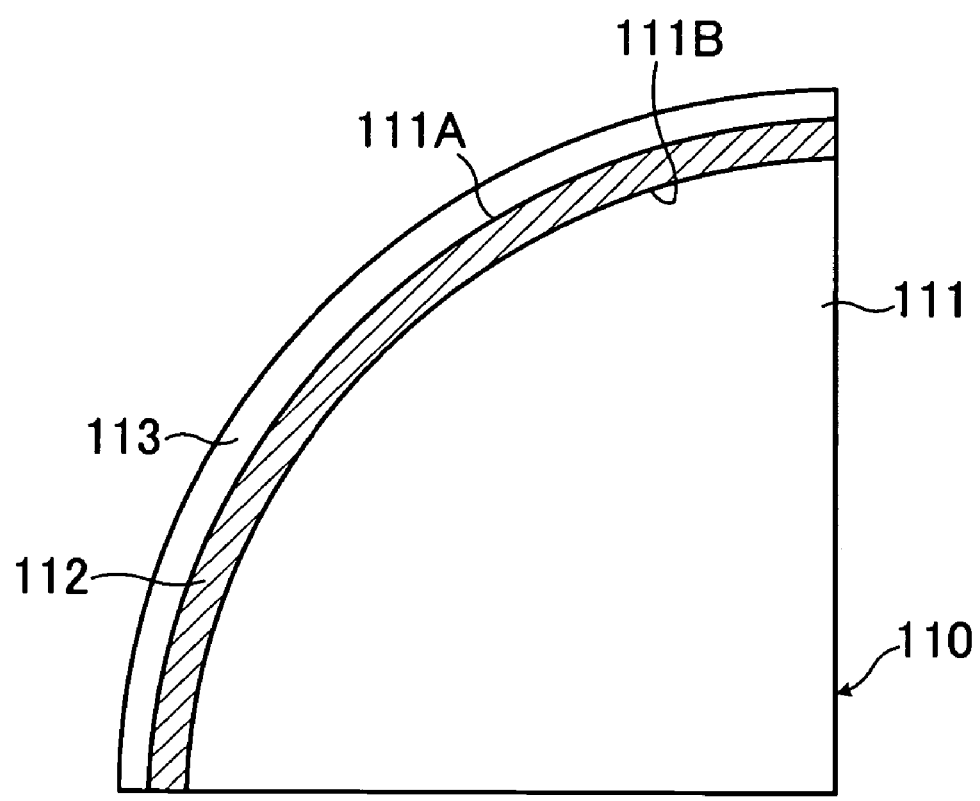
FIG. 37 is a sectional view taken along lines E-E of FIG. 36.
Figure 38:
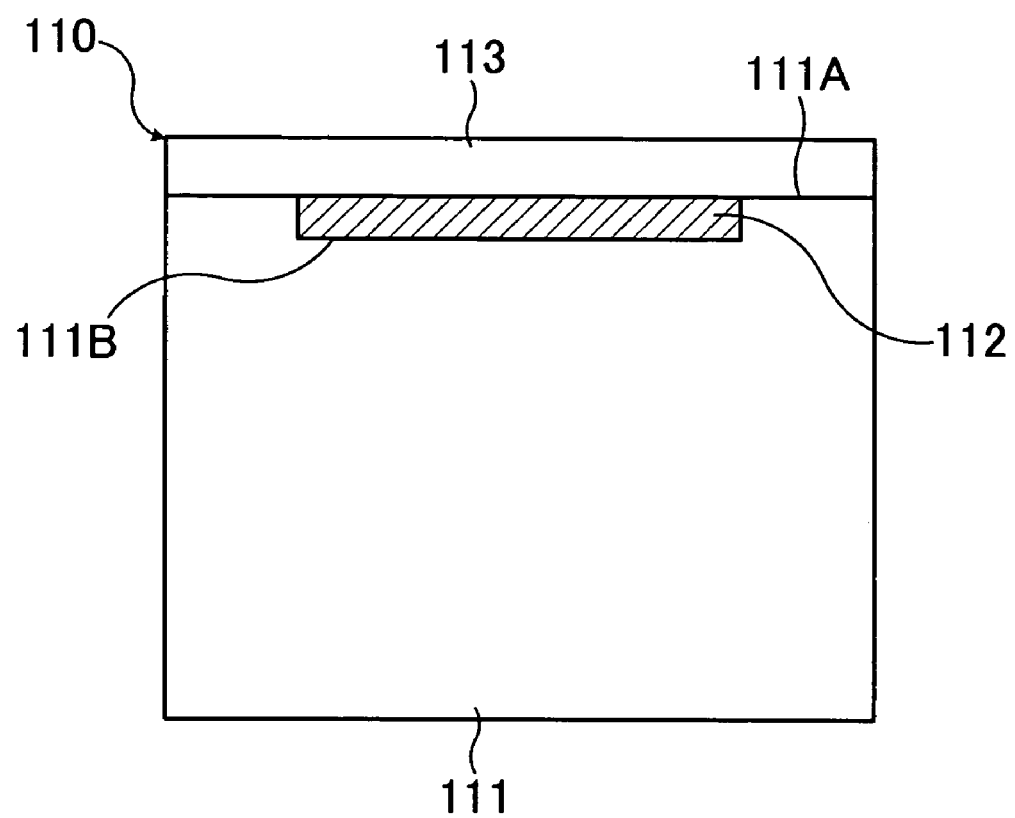
FIG. 38 is a sectional view taken in the direction of the depth of the core section shown in FIG. 36.

FIG. 36 is a front view of a feature of an optical waveguide structure in which a core section has a slab structure. FIG. 37 is a sectional view taken along lines E-E of FIG. 36. FIG. 38 is a sectional view taken in the direction of the depth of the core section shown in FIG. 36.

In an optical waveguide structure 110 shown in FIGS. 36 through 38, a core section 112 is formed in a wide groove 111B formed in a first clad section 111 having a convex surface 111A. A second clad section 113 covers the core section 112. As a result, a slab structure is formed. With the optical waveguide structure 110 having such a structure, it is possible to make light which propagates through the core section 112 travel in an oblique direction by, for example, properly setting the angle of incidence of the light to the core section 112 and by using the light property of traveling straight.

With the above optical waveguide structure 90, lenses may be formed opposite both ends of the core section 92 on the first clad section 91 in the same way that is shown in FIGS. 30 and 31 to reduce optical coupling loss. The same applies to the above optical waveguide structures 100 and 110.

Second Embodiment

Figure 39:
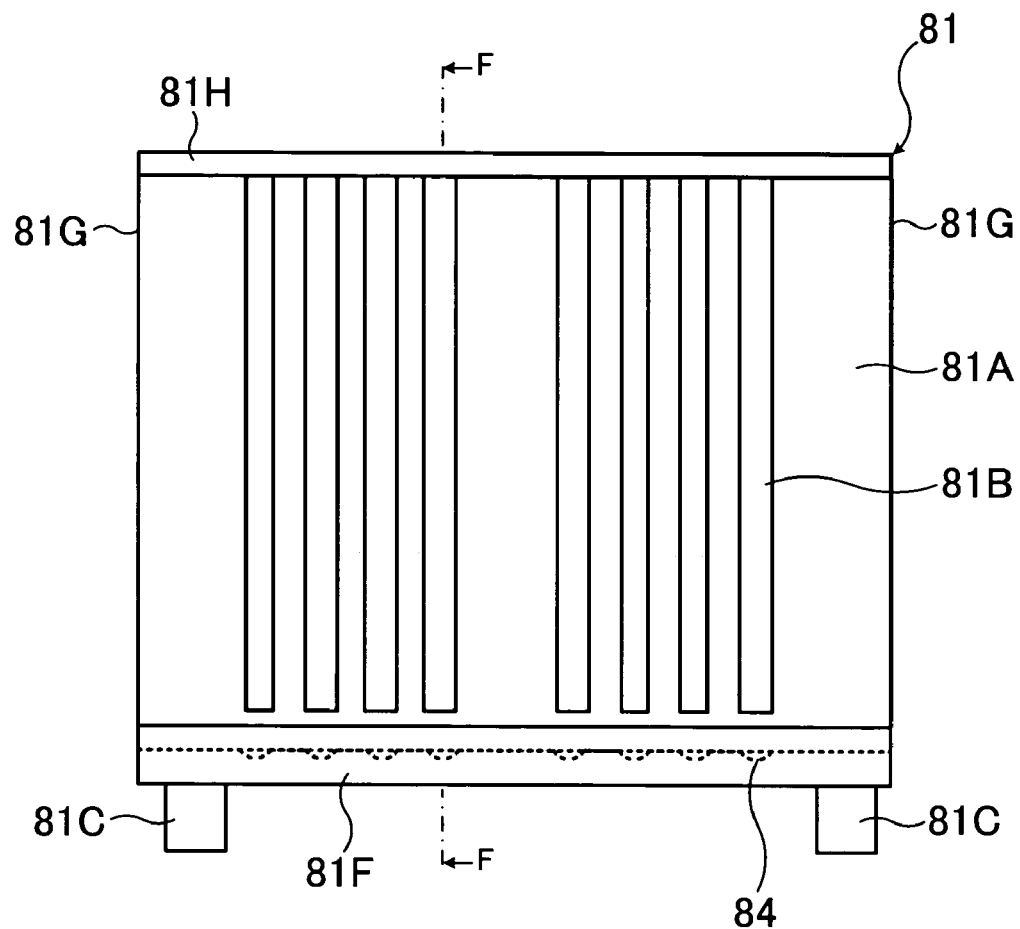
FIG. 39 is a front view of a feature for roughly describing a first process performed for fabricating an optical waveguide structure into which lenses are integrated.
Figure 40:
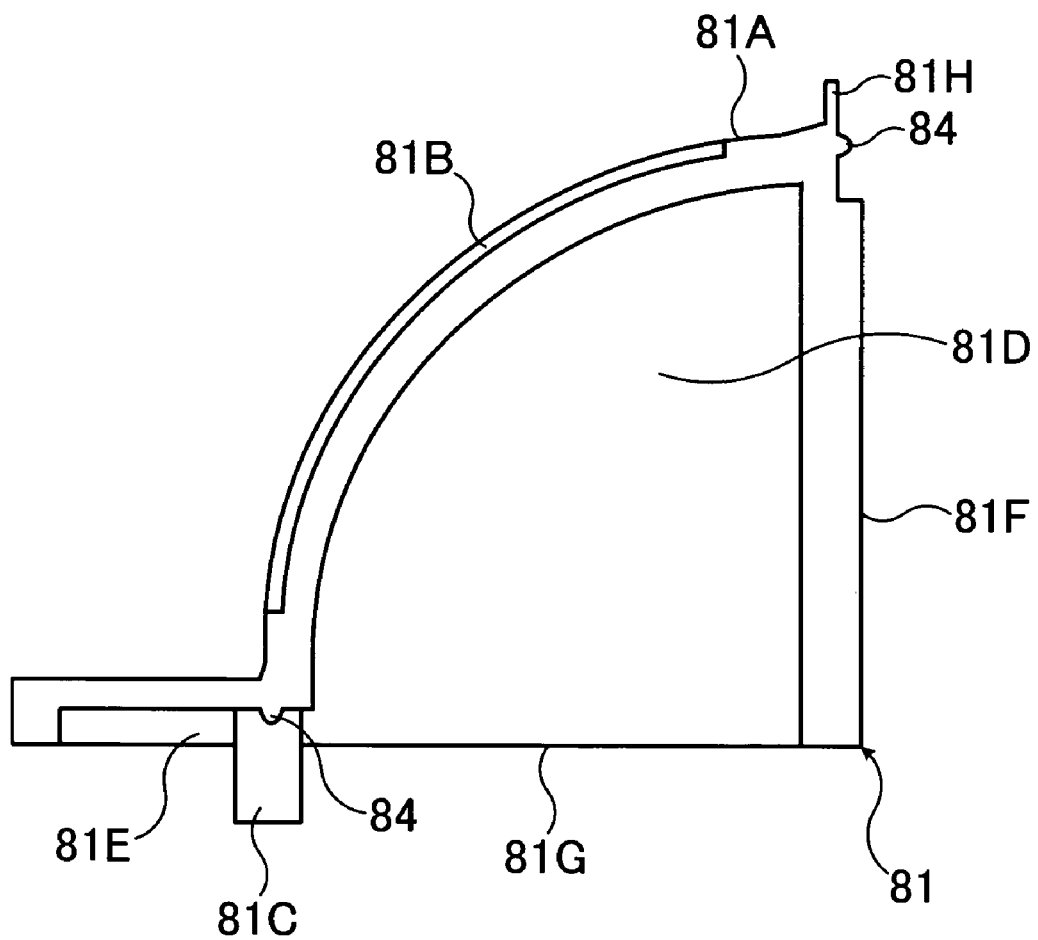
FIG. 40 is a sectional view of the feature for roughly describing the first process performed for fabricating the optical waveguide structure into which the lenses are integrated.
Figure 41:
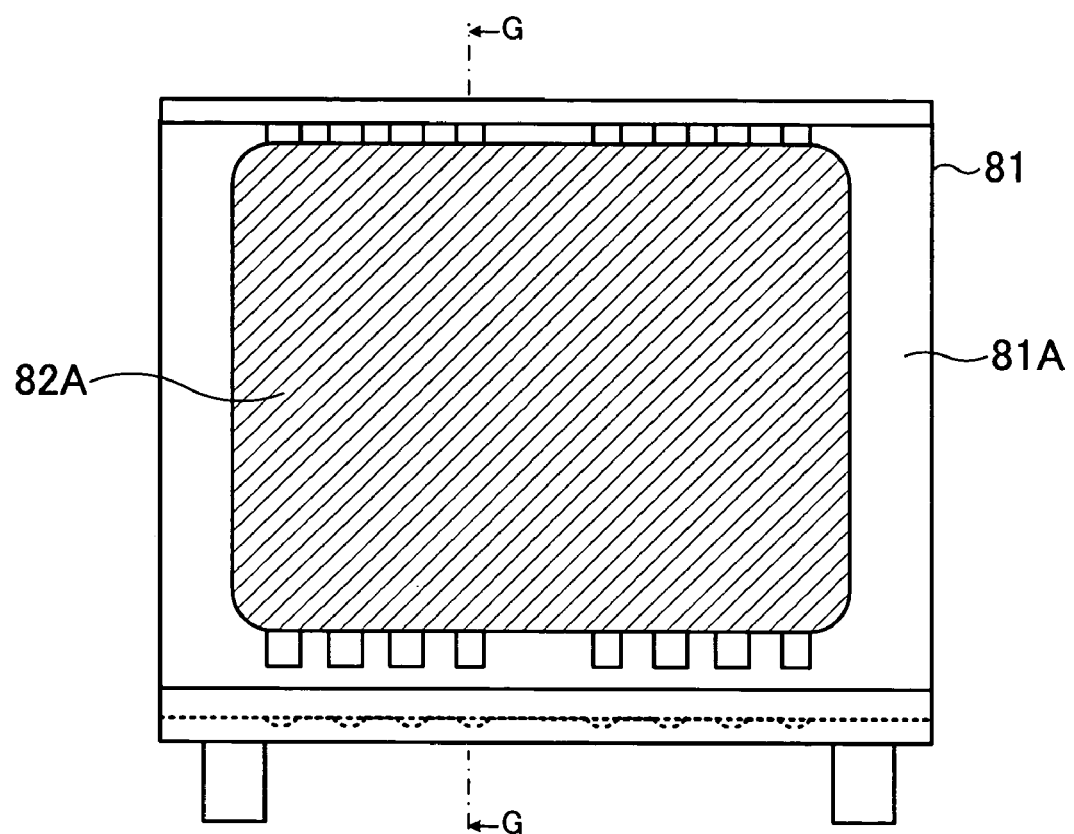
FIG. 41 is a front view of a feature for roughly describing a second process performed for fabricating the optical waveguide structure into which the lenses are integrated.
Figure 42:
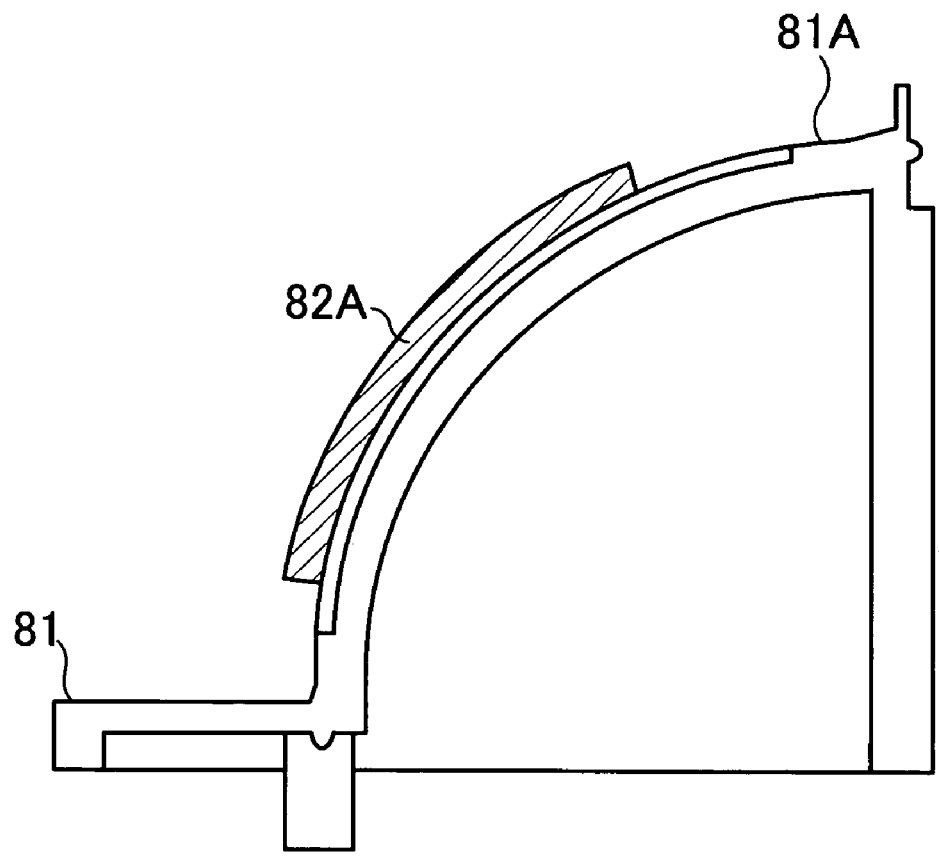
FIG. 42 is a sectional view of the feature for roughly describing the second process performed for fabricating the optical waveguide structure into which the lenses are integrated.
Figure 43:
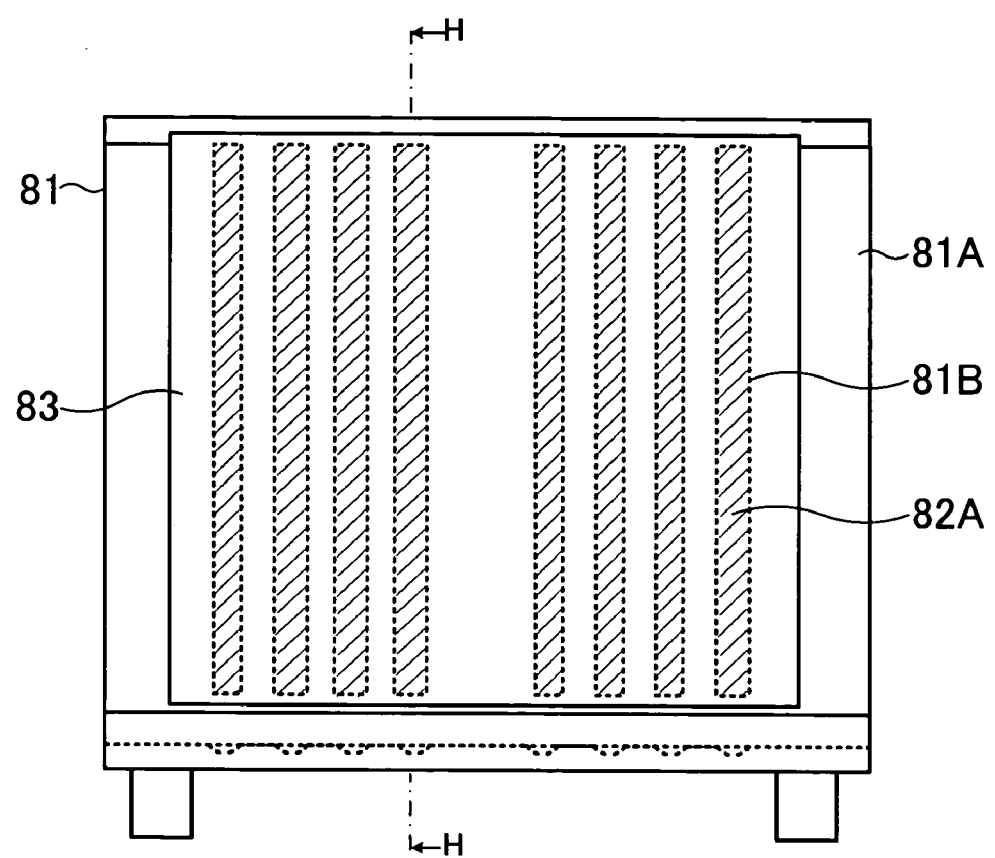
FIG. 43 is a front view of a feature for roughly describing a third process performed for fabricating the optical waveguide structure into which the lenses are integrated.
Figure 44:
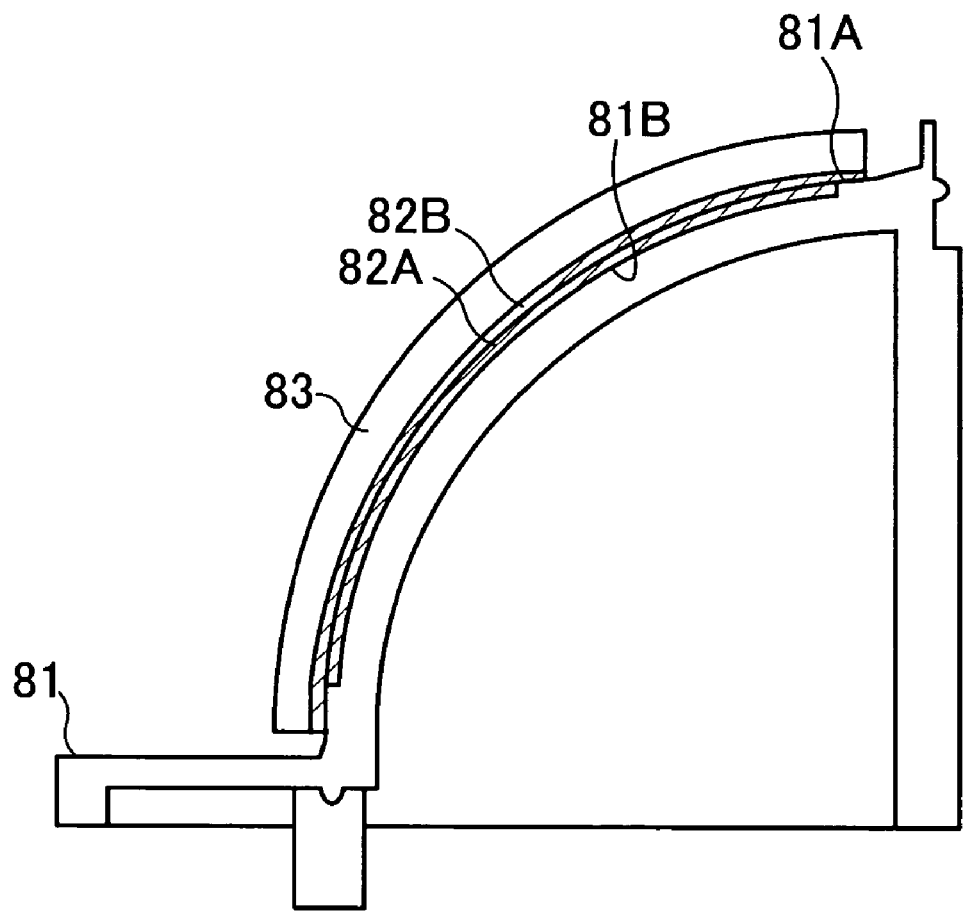
FIG. 44 is a sectional view of the feature for roughly describing the third process performed for fabricating the optical waveguide structure into which the lenses are integrated.

FIGS. 39 through 44 are views for roughly describing processes for fabricating an optical waveguide structure into which lenses are integrated. FIG. 39 is a front view of a feature for roughly describing a first process performed for fabricating an optical waveguide structure into which lenses are integrated. FIG. 40 is a sectional view of the feature for roughly describing the first process performed for fabricating the optical waveguide structure into which the lenses are integrated. FIG. 41 is a front view of a feature for roughly describing a second process performed for fabricating the optical waveguide structure into which the lenses are integrated. FIG. 42 is a sectional view of the feature for roughly describing the second process performed for fabricating the optical waveguide structure into which the lenses are integrated. FIG. 43 is a front view of a feature for roughly describing a third process performed for fabricating the optical waveguide structure into which the lenses are integrated. FIG. 44 is a sectional view of the feature for roughly describing the third process performed for fabricating the optical waveguide structure into which the lenses are integrated. FIG. 40 is a sectional view taken along lines F-F of FIG. 39. FIG. 42 is a sectional view taken along lines G-G of FIG. 41. FIG. 44 is a sectional view taken along lines H-H of FIG. 43. The same symbols that are used in FIGS. 30 and 31 indicate the same components or have the same meanings.

First, a metal mold for injection molding including a first block having a curved surface and convex portions in areas on the curved surface where core sections are to be embedded for forming grooves with a 50-by-50 micron cross section and a radius of curvature of 10 mm and a second block having a structure corresponding to the first block is filled in with a transparent clad material to perform injection molding. As a result, a first clad section 81 having a structure shown in FIGS. 39 and 40 is formed. A thermoplastic resin (polyolefin resin) with a refractive index of 1.50 is used as the clad material for forming the first clad section 81.

The first clad section 81 formed has a convex surface 81A a cross section of which is like an arc. A plurality of grooves 81B are formed in areas on the convex surface 81A where core sections are to be formed. Lenses 84 are formed at appropriate places opposite both ends of each groove 81B. A guide structure 81C for fixing the first clad section 81 onto a board is formed on the bottom of the first clad section 81.

There is a cavity 81D inside the first clad section 81. By forming the cavity 81D, a part can be lightened and costs can be cut. Moreover, when an optical waveguide structure 80 is fixed onto the board, chips and the like mounted on the board can be put into the cavity 81D. As a result, an optical module can be miniaturized and a chip layout can be performed more freely on a board.

In addition, a concavity 81E is formed in an under surface of the first clad section 81 and is surrounded by a wall. When the first clad section 81 is fitted on the board, a sealing structure that prevents a surface type optical device mounted on the board from being influenced by dust or the like from the outside is realized by the wall.

The first clad section 81 has the convex surface 81A, a wall 81F on a side on which the lenses 84 are formed and which is opposite to an optical connector 70, and a sidewall 81G which connects the convex surface 81A and the wall 81F. The above cavity 81D is space surrounded by them. The sidewall 81G is not essential. However, to ensure strength capable of withstanding force applied to core sections 82 in the direction in which light propagates, it is preferable that the sidewall 81G should be formed. This force includes force applied when a second clad section 83 described later is stuck, stress which occurs when a liquid core material 82A is cured by ultraviolet rays, and force applied when the optical waveguide structure 80 is fitted on the board 51.

As shown in FIGS. 41 and 42, then a suitable amount of the liquid core material 82A is dropped onto the convex surface 81A of the first clad section 81 with a dispenser. A liquid ultraviolet-cured resin (epoxy resin, acrylic resin, or the like) with a refractive index of 1.55 higher than that of the clad material used for making the first clad section 81 is used as the liquid core material 82A.

As shown in FIGS. 43 and 44, then the second clad section 83 which is made from a clad material with a refractive index equal to that of the first clad section 81 and which has the shape of a film with a thickness of 50 µm is stuck on the convex surface 81A onto which the liquid core material 82A has been dropped so that the grooves 81B will be filled in with the liquid core material 82A and so that a film 82B (not shown in FIG. 43) of the excess liquid core material 82A will remain between the first clad section 81 and the second clad section 83.

When the second clad section 83 is stuck on the convex surface 81A, the liquid core material 82A is irradiated with ultraviolet rays in a state in which a soft material, such as silicone rubber, placed on the second clad section 83 is pressed down from above with constant force. The second clad section 83 is pressed down, so the liquid core material 82A spreads thin. The liquid core material 82A is cured by ultraviolet rays. As a result, the core sections 82 are formed by the liquid core material 82A which cures in the grooves 81B, and the second clad section 83 is adhered to the first clad section 81 by the film 82B which remains between them.

The thickness of the film 82B which is left between the first clad section 81 and the second clad section 83 as an adhesive layer is controlled by the amount dropped by the dispenser and pressure applied at curing time. However, to avoid problems, such as cross talk, it is preferable that the thickness of the film 82B should be 0.5 µm or less.

Figure 45:
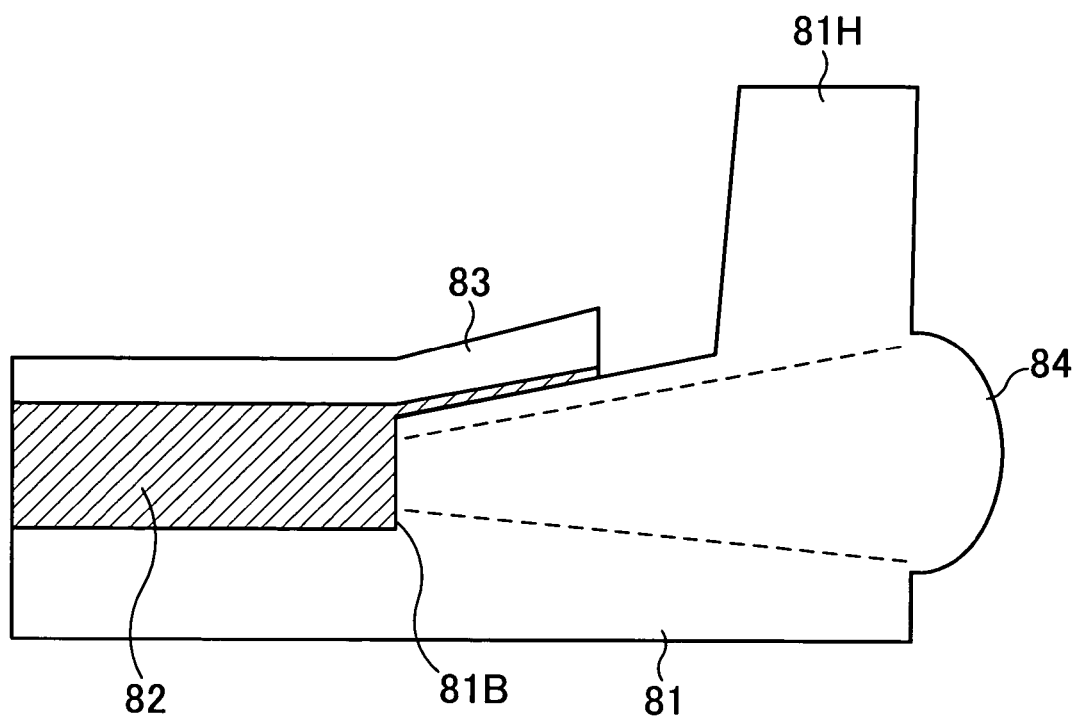
FIG. 45 is an enlarged sectional view of a lens portion in the optical waveguide structure into which the lenses are integrated.

FIG. 45 is an enlarged sectional view of a lens portion in the optical waveguide structure into which the lenses are integrated.

In the optical waveguide structure 80, an end portion of the first clad section 81 is formed so that its thickness in the direction of the depth of the groove 81B will gradually increase toward the second clad section 83 in an area with a length of about 0.8 to 1.0 mm from the end of the groove 81B where the core section 82 is formed to the lens 84. As a result, even if light outputted from the end of the core section 82 diverges at, for example, a divergence angle shown by a chain line in FIG. 45, the light can be condensed onto the lens 84 at a light loss.

A projection 81H formed on the first clad section 81 prevents the liquid core material 82A that is left when the second clad section 83 is stuck by dropping the liquid core material 82A from flowing out to the lens 84 side.

Figure 46:
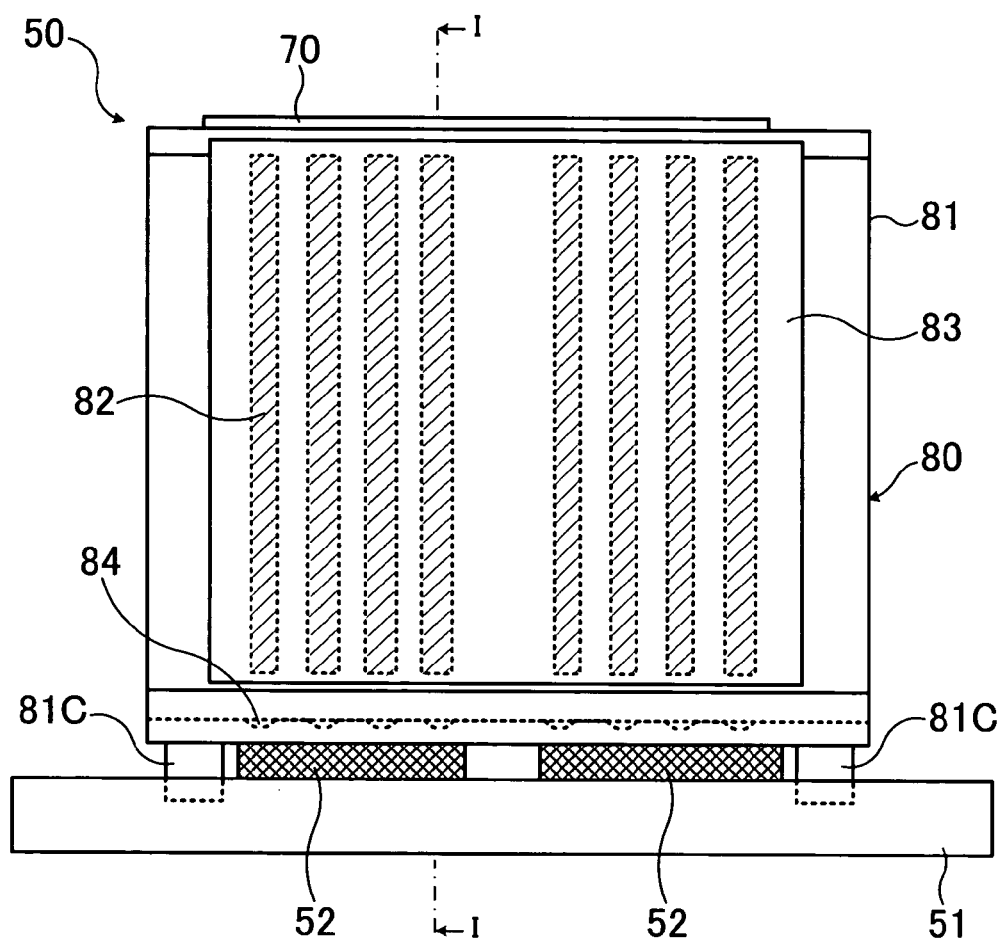
FIG. 46 is a front view of a feature of an optical module using the optical waveguide structure into which the lenses are integrated.
Figure 47:
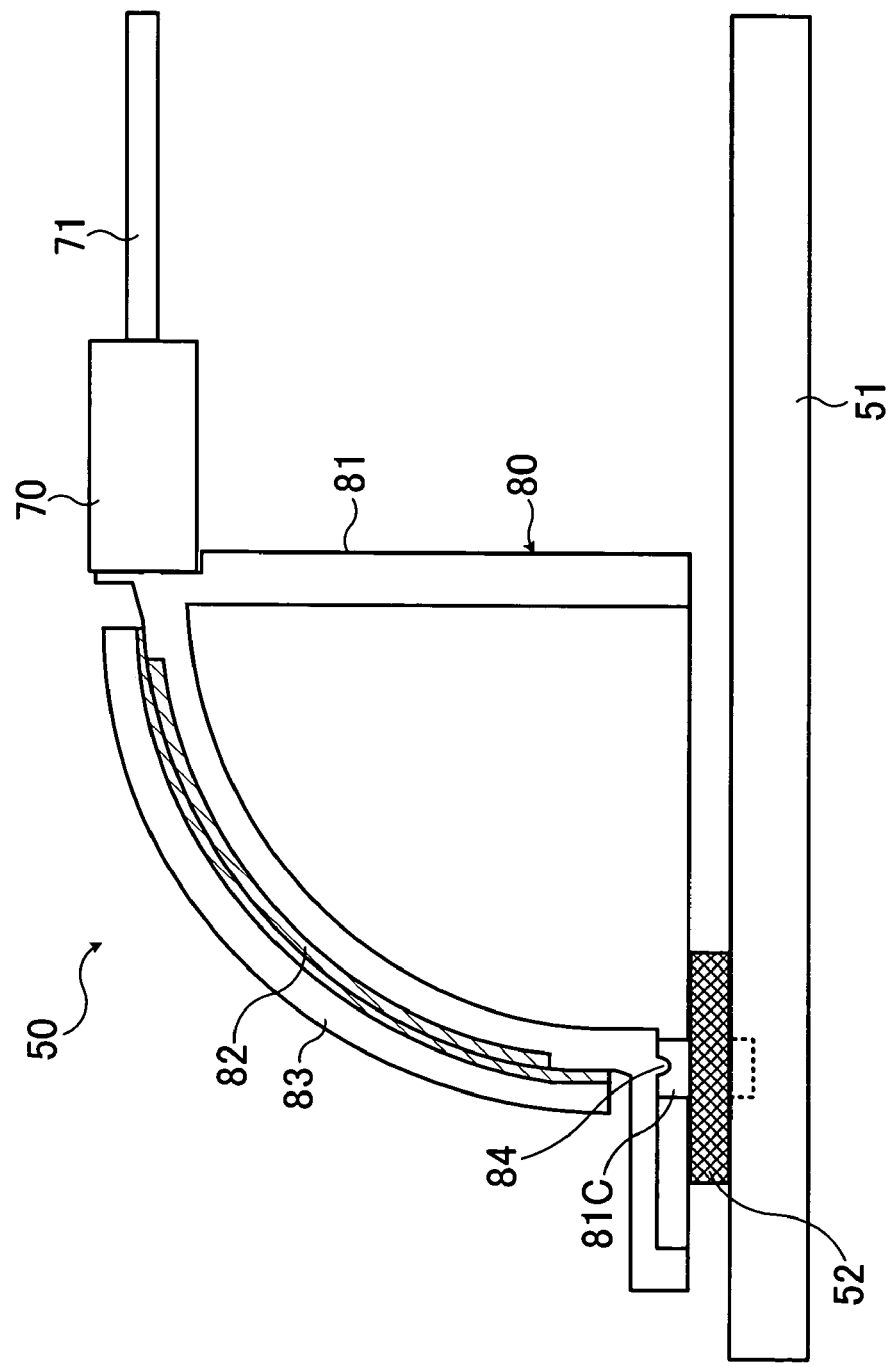
FIG. 47 is a sectional view taken along lines I-I of FIG. 46.
Figure 48:
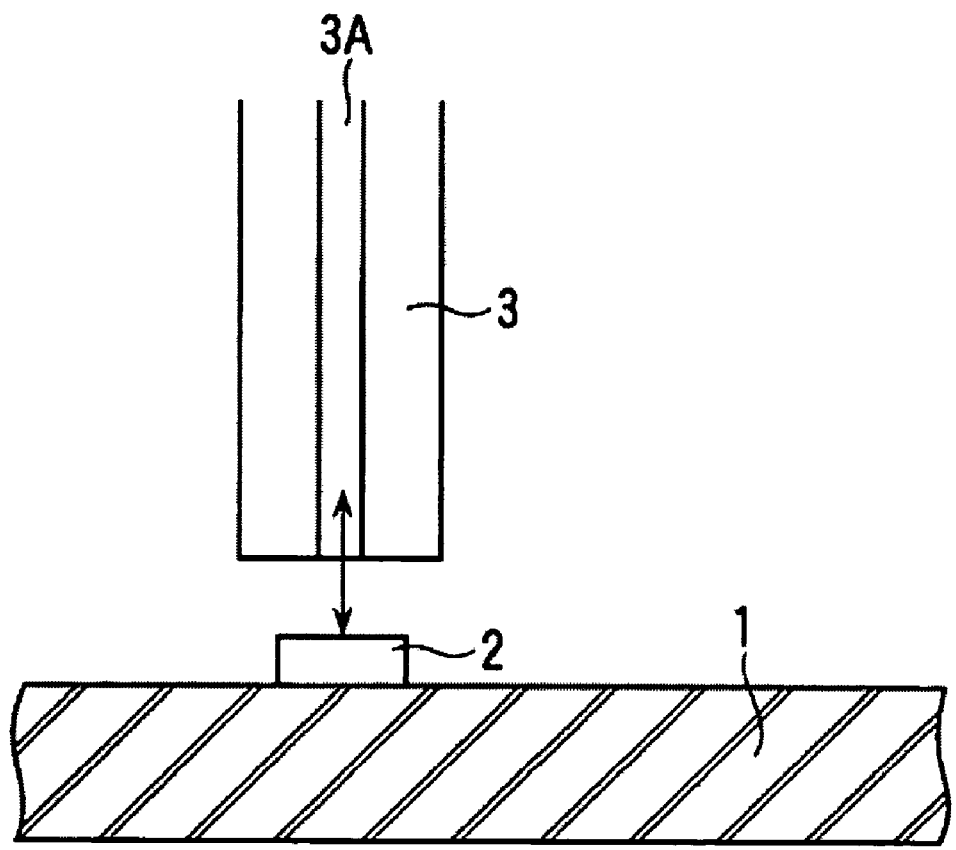
FIG. 48 is a sectional view of a feature of a module in which an optical fiber is located perpendicularly to a board.

FIG. 46 is a front view of a feature of an optical module using the optical waveguide structure into which the lenses are integrated. FIG. 47 is a sectional view taken along lines I-I of FIG. 46. The same symbols that are used in FIGS. 27 through 31 indicate the same components or have the same meanings.

An optical module 50 is formed by using the optical waveguide structure 80 formed in the above way. The optical waveguide structure 80 is fixed onto a board 51 on which a surface type optical device 52 is mounted by a guide structure 81C with the surface type optical device 52 between. In this case, the optical waveguide structure 80 is fixed onto the board 51 so that a lens 84 formed at one end portion of each core section 82 will be opposite to the surface type optical device 52. In addition, an optical connector 70 to which an optical fiber 71 is connected is fixed to the other end portion of each core section 82 where a lens 84 is formed so that a core of the optical fiber 71 and the core sections 82 of the optical waveguide structure 80 will optically be coupled together.

To fix the optical waveguide structure 80 to the board 51 and fix the optical connector 70 to the optical waveguide structure 80, alignment pins and pin holes may be formed in advance at appropriate positions. These alignment pins are fitted into the corresponding pin holes at assembly time. This is the same with the first embodiment of the present invention. In this example, the guide structure 81C formed as an alignment pin is fitted into a pin hole made in the board 51 to fix the optical waveguide structure 80 onto the board 51.

In such a way the optical waveguide structure 80 is fitted to the board 51 in a state in which their relative positions are correct. Similarly, the optical connector 70 and the optical fiber 71 is fitted to the optical waveguide structure 80 in the optical module 50 in a state in which their relative positions are correct. As a result, the course of light inputted into the core sections 82 of the optical waveguide structure 80 is gradually turned almost squarely.

In the above descriptions, the course of light that propagates through the core section of the optical waveguide structure is turned almost squarely. However, an angle at which the course of light is turned is not limited to this value. An angle at which the course of light is turned can be set freely according to, for example, a use for an optical module.

Even if a surface type optical device, such as a surface emitting laser diode or a photodiode, is mounted on a board and optical transmission media, such as an optical fiber and an optical waveguide, is located parallel to the board, an optical signal from the surface type optical device can be inputted efficiently to the optical transmission medium by the core sections formed in the curved surface of the clad section by locating the optical waveguide having the above structure between the surface type optical device and the optical transmission medium. Similarly, an optical signal from the optical transmission medium can be inputted efficiently to the surface type optical device.

Therefore, even if light must be deflected squarely in an optical module to optically couple a surface type optical device and an optical transmission medium together, the optical waveguide having the above structure should be used. It is unnecessary to use a mirror. Accordingly, there in no need for troublesome optical axis alignment and an optical module can be assembled very easily.

In addition, to fabricate the optical waveguide having the above structure, molding, such as injection molding or press molding, or a combination of mechanical cutting, laser abrasion, sandblast, a plasma process, and the like can be used. The optical waveguide having the above structure can be fabricated easily by any of these methods. Good productivity is obtained especially by molding.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical waveguide structure comprising:
 a first clad section having a rigid curved surface for gradually turning the direction in which light travels almost squarely and a groove formed in the curved surface along the direction in which light travels;
 a core section which is made from only a transparent material with a refractive index higher than the refractive index of the first clad section and with which the groove is filled in; and
 a second clad section, which is a different component from the first clad section, and which covers an exposed surface of the core section and the curved surface of the first clad section on the curved surface side and which is integrated with the first clad section;

wherein the core section has a higher reflective index than the first and second clad sections, and wherein the first and second clad sections reflect light propagating within the core section and confine the propagating light in the core section.

2. The optical waveguide structure according to claim 1, further comprising: a lens is formed at a light input-output end of the core section so as to be integrated into the first clad section.

3. The optical waveguide structure according to claim 1 wherein the core section embedded in the curved surface of the first clad section has a taper structure in the direction in which light propagates.

4. The optical waveguide structure according to claim 1, wherein:

a plurality of grooves each of which corresponds to the groove are formed;

a plurality of core sections each of which corresponds to the core section are formed; and pitches at a light input end at which the plurality of core sections are formed are different from pitches at a light output end at which the plurality of core sections are formed.

5. An optical waveguide structure comprising:

a first clad section having a curved surface for gradually turning the direction in which light travels almost squarely and a groove formed in the curved surface along the direction in which light travels;

a core section which is made from a transparent material with a refractive index higher than the refractive index of the first clad section and with which the groove is filled in;

a second clad section which covers an exposed surface of the core section and the curved surface of the first clad section and which is integrated with the first clad section;

a concavity which is formed in a surface opposite a surface type optical device of the first clad section and which houses the surface type optical device to isolate the surface type optical device from the outside;

a lens formed near a light input-output end of the core section embedded in the curved surface of the first clad section and opposite the surface type optical device so as to be integrated into the first clad section; and a guide structure formed on the first clad section for making position adjustment at the time of the first clad section being fixed onto a board.

6. The optical waveguide structure according to claim 5, wherein the guide structure is an alignment pin hole into which a pin is fitted.

7. The optical waveguide structure according to claim 5, wherein the core section embedded in the curved surface of the first clad section has a taper structure in the direction in which light propagates.

8. The optical waveguide structure according to claim 5, further comprising:

a plurality of grooves each of which corresponds to the groove are formed;

a plurality of core sections each of which corresponds to the core section are formed; and pitches at a light input end at which the plurality of core sections are formed are different from pitches at a light output end at which the plurality of core sections are formed.

9. An optical waveguide structure comprising: a first clad section having a groove on a convex surface side of a rigid curved surface with an arc-like cross section for gradually turning the direction in which light travels almost squarely, the groove extending in the direction in which the curved surface curves;

a core section with which the groove is filled in and by which input light is propagated; and a second clad section, which is a different component from the first clad section, and which is formed on the convex surface side of the curved surface and which covers the core section on the convex surface side;

wherein the core section has a higher reflective index than the first and second clad sections, and wherein the first and second clad sections reflect light propagating within the core section and confine the propagating light in the core section.

10. The optical waveguide structure according to claim 9, wherein the refractive index of the core section is higher than the refractive index of the first clad section and the second clad section.

11. The optical waveguide structure according to claim 9, wherein the second clad section is adhered to the first clad section via a film of the same material that is used for forming the core section.

12. The optical waveguide structure according to claim 9, wherein the first clad section has a concavity which can house an optical device.

13. The optical waveguide structure according to claim 9, wherein the first clad section includes a lens near an end of the core section formed in the groove.

14. The optical waveguide structure according to claim 13, wherein the first clad section is formed so that the thickness of the first clad section in the direction of the depth of the groove will gradually increase toward the second clad section which covers the core section in an area from the end of the core section formed in the groove to the lens.

15. The optical waveguide structure according to claim 9, wherein the first clad section has a guide structure by which position adjustment can be made at fixing time.

16. The optical waveguide structure according to claim 9, wherein a sidewall is formed on the curved surface in which the groove is formed.

17. An optical module comprising:

a board;

an optical device mounted on the board; and an optical waveguide structure which propagates light inputted to the optical device or light outputted from the optical device, the optical waveguide structure including:

a first clad section having a groove on a convex surface side of a rigid curved surface with an arc-like cross section for gradually turning the direction in which light travels almost squarely, the groove extending in the direction in which the curved surface curves;

a core section with which the groove is filled in and by which light is propagated; and a second clad section, which is a different component from the first clad section, and which is formed on the convex surface side of the curved surface and which covers the core section on the convex surface side, wherein the optical waveguide structure is located so that an end of the core section will be directly above the optical device mounted on the board;

wherein the core section has a higher reflective index than the first and second clad sections, and wherein the first and second clad sections reflect light propagating within the core section and confine the propagating light in the core section.

18. The optical module according to claim 17, wherein the first clad section includes a lens near the end of the core section formed in the groove.

19. An optical wavelength structure comprising:
a first clad section having a rigid curved surface for gradually turning the direction in which light travels almost squarely and a groove formed in the curved surface along the direction in which light travels;
a core section which is made from a transparent material with a refractive index higher than the refractive index of the first clad section and with which the groove is filled in; and
a second clad section having a shape of a film, which is a different component from the first clad section, and which covers an exposed surface of the section and the curved surface of the first clad section on the curved surface side and which is integrated with the first clad section;

wherein the core section has a higher reflective index than the first and second clad sections, and wherein the first and second clad sections reflect light propagating within the core section and confine the propagating light in the cores section.

* * * * *